US012621727B2

(12) United States Patent
Fu et al.

(10) Patent No.: US 12,621,727 B2
(45) Date of Patent: May 5, 2026

(54) METHOD FOR INDICATING SLICE INFORMATION, TERMINAL DEVICE AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Shukun Wang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 334 days.

(21) Appl. No.: 18/332,009

(22) Filed: Jun. 9, 2023

(65) Prior Publication Data
US 2023/0328599 A1 Oct. 12, 2023

Related U.S. Application Data

(63) Continuation of application No. PCT/CN2020/142219, filed on Dec. 31, 2020.

(51) Int. Cl.
H04W 36/00 (2009.01)
H04W 36/08 (2009.01)

(52) U.S. Cl.
CPC ....... *H04W 36/0061* (2013.01); *H04W 36/08* (2013.01)

(58) Field of Classification Search
CPC ..... H04W 48/18; H04W 48/16; H04W 36/08; H04W 36/0061; H04W 36/24
See application file for complete search history.

(56) References Cited

U.S. PATENT DOCUMENTS

| | | | |
|---|---|---|---|
| 9,985,799 B2 | 5/2018 | Clougherty | |
| 2016/0073327 A1 | 3/2016 | Clougherty et al. | |
| 2020/0120547 A1* | 4/2020 | Han | H04W 36/0083 |
| 2022/0303884 A1* | 9/2022 | Chen | H04W 76/00 |
| 2023/0037553 A1* | 2/2023 | Shih | H04W 36/13 |
| 2023/0056855 A1* | 2/2023 | Jiang | H04W 36/302 |
| 2023/0209453 A1* | 6/2023 | Basu | H04W 48/18 |
| | | | 370/328 |
| 2025/0212121 A1* | 6/2025 | Wang | H04W 52/0229 |

FOREIGN PATENT DOCUMENTS

| | | |
|---|---|---|
| CN | 111490899 A | 8/2020 |
| CN | 111866991 A | 10/2020 |
| CN | 112153711 A | 12/2020 |

(Continued)

OTHER PUBLICATIONS

International Search Report in the international application No. PCT/CN2020/142219, mailed on Sep. 15, 2021.

(Continued)

*Primary Examiner* — Shukri Taha
(74) *Attorney, Agent, or Firm* — PERKINS COIE LLP

(57) ABSTRACT

A method for indicating slice information, a terminal device and a network device are provided. The method for indicating slice information includes: receiving first slice information from a network device. The first slice information includes at least one of: at least one first slice identification or at least one piece of first frequency point information.

20 Claims, 6 Drawing Sheets

(56)        References Cited

FOREIGN PATENT DOCUMENTS

WO        2019101070  A1      5/2019

OTHER PUBLICATIONS

Written Opinion of the International Search Authority in the international application No. PCT/CN2020/142219, mailed on Sep. 15, 2021.
3GPP TS 38.331 V16.2.0 (Sep. 2020), 3rd Generation Partnership Project; Technical Specification Group Radio Access Network; NR; Radio Resource Control (RRC) protocol specification (Release 16).
Supplementary European Search Report in the European application No. 20967765.7, mailed on Dec. 4, 2023. 10 pages.

* cited by examiner

METHOD FOR INDICATING SLICE INFORMATION, TERMINAL DEVICE AND NETWORK DEVICE

CROSS-REFERENCE TO RELATED APPLICATION

This application is a continuation of International Patent Application No. PCT/CN2020/142219, filed on Dec. 31, 2020, the disclosure of which is hereby incorporated by reference in its entirety.

BACKGROUND

A strong requirement for wireless communications in a vertical market is obvious to all. In order to meet the requirement of the vertical market on delay, mobility, reliability and location accuracy, network slicing is utilized to provide lower latency, more targeted, more flexible and more expandable solutions for multiple services with different requirements. How to indicate slice related information has become an urgent problem to be solved.

SUMMARY

The present disclosure relates to the technical field of communications, in particular, to a method for indicating slice information, a terminal device and a network device.

Embodiments of the present disclosure provides a method for indicating slice information, a terminal device and a network device, and provides a plurality of schemes for indicating slice related information, to flexibly indicate slice information to the terminal device.

In a first aspect, there is provided a method for indicating slice information is provided, the method includes receiving first slice information from a network device. The first slice information includes at least one of: at least one first slice identification or at least one piece of first frequency point information.

In a second aspect, there is provided a terminal device, the terminal device includes a processor; and a memory for storing a computer program executable by the processor. The processor is configured to execute the computer program to perform the method for indicating slice information in the first aspect.

In a third aspect, there is provided a network device, the network device includes a processor; and a memory for storing a computer program executable by the processor. The processor is configured to execute the computer program to transmit first slice information to a terminal device. The first slice information comprises at least one of: at least one first slice identification or at least one piece of first frequency point information.

DETAILED DESCRIPTION

Figure 1:
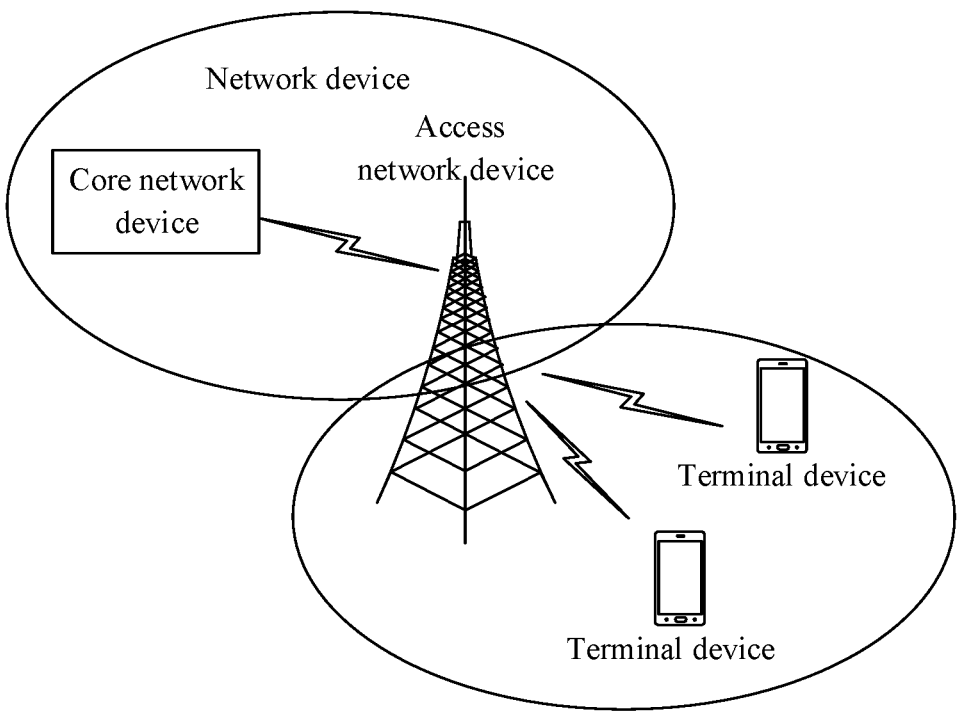
FIG. 1 is a system architecture diagram of a communication system applied to an embodiment of the present disclosure.

The technical solutions in the embodiments of the disclosure will be described below in conjunction with the drawings in the embodiments of the disclosure. It is apparent that, the described embodiments are some of the embodiments of the disclosure rather than all of the embodiments. Based on the embodiments in the disclosure, all other embodiments obtained by those of ordinary skilled in the art without paying inventive efforts shall fall within the protection scope of the disclosure.

In embodiments of the present disclosure, the words "exemplary" or "example" are used as examples, instances, or illustrations. Any embodiment or design scheme described as "exemplary" or "example" in embodiments of the present disclosure should not be construed as being preferred or more advantageous than other embodiments or design schemes. Rather, the use of the words "exemplary" or "example" is intended to present relevant concepts in a concrete manner.

The term "and/or" used herein is only an association relationship describing associated objects, which means that there may be three relationships. For example, "A and/or B" may have three cases: only A exists, both A and B exist and only B exists. In addition, the character "/" used herein indicates that the associated objects are in an "or" relationship. For example, A/B denotes A or B.

The following description briefly describes related technologies and some terms involved in the embodiments of the present disclosure.

A strong requirement for wireless communications in a vertical market is obvious to all. In order to meet the requirement of the vertical market on delay, mobility, reliability and location accuracy, a radio access network (RAN) is required to be enhanced so as to support vertical services in the access network. One of the possible ways is to provide lower latency, more targeted, more flexible and more expandable solutions for multiple services with different requirements based on network slicing. More specifically, based on RAN slicing, application providers may set the design, deployment and operation of the RAN to better support the application providers' businesses. Therefore, Release 17 introduces the enhancement on slicing in the access network, and the enhancement specifically involves following contents.

The study item aims to investigate the enhancement on RAN support of network slicing. Detailed objectives of the study item are: study of mechanisms to enable UE fast access to the cell supporting the intended slice, including a radio access network group 2 [RAN2]:

a. Slice based cell reselection under network control;

b. Slice based random access channel (RACH) configuration or access barring.

Note: whether the existing mechanism can meet this scenario or requirement can be studied.

In related technologies of Rel-15, the slicing only involves a core network side. Specifically, a terminal device may report a slicing requirement to a network device, and the network device selects an appropriate access and mobility management function (AMF) according to the slicing requirement reported by the UE, to establish a service session between the terminal device and the network.

In the related art, when a UE access stratum (AS) receives slice information of the UE NAS, i.e., single network slice selection assistance information (S-NSSAI), the UE notifies the S-NSSAI information to a gNB through a MSG5 (or an air interface RRC message), then the gNB selects an appropriate AMF to provide slicing services.

The R17 discusses indicating slice related information in a system information block (SIB) or a dedicated RRC message. However, a large air interface signaling overhead may be caused by indicating the slice related information, thus, it is necessary to consider how to indicate the slice related information.

FIG. 1 is a system architecture diagram of a communication system applied to an embodiment of the present disclosure. The communication system may include a network device which may be a device communicating with a terminal device (or called a communication terminal or a terminal). The network device may provide communication coverage for a specific geographical area and may communicate with a terminal device located within the coverage area. FIG. 1 exemplarily illustrates one network device and two terminal devices. Alternatively, the communication system may include a plurality of network devices, and another number of terminal devices may be included within the coverage of each network device, which is not limited in the embodiments of the present application. Alternatively, the communication system may further include other network entities such as a network controller, a mobility management entity, which is not limited in the embodiments of the present application.

Alternatively, the communication system may include a plurality of network devices, and another number of terminal devices may be included within the coverage of each network device, which is not limited in the embodiments of the present disclosure. Alternatively, the communication system may further include other network entities such as a network controller, a mobility management entity, which is not limited in the embodiments of the present application.

Embodiments of the present disclosure describe various embodiments in connection with the network device and the terminal device. The terminal device may also be referred to as User Equipment (UE), an access terminal, a user unit, a user station, a mobile station, a mobile platform, a remote station, a remote terminal, a mobile device, a user terminal, a terminal, a wireless communication device, a user agent or a user apparatus, etc.

The terminal device may be a station (ST) in a wireless local area network (WLAN), and may be a cellular telephone, a cordless telephone, a session initiation protocol (SIP) telephone, a wireless local loop (WLL) station, a personal digital assistant (PDA) device, a handheld device having wireless communication functionality, a computing device or other processing device connected to a wireless modem, a vehicle-mounted device, a wearable device, a next-generation communication system such as a terminal device in a new radio (NR) network, or a terminal device in a future evolved public land mobile network (PLMN).

In embodiments of the present disclosure, the terminal device may be deployed on the land, such as being indoor or outdoor, hand-held, wearable or vehicle-mounted. The terminal device may also be deployed on the water (such as ships, etc.). The terminal device may also be deployed in the air (such as airplanes, balloons and satellites, etc.).

In embodiments of the present disclosure, the terminal device can be a mobile phone, a pad, a computer with wireless transceiver function, a virtual reality (VR) terminal device, an augmented reality (AR) terminal device, a wireless terminal device in industrial control, a wireless terminal device in self driving, a wireless terminal device in remote medical care, a wireless terminal device in a smart grid, a wireless terminal device in transportation safety, a wireless terminal device in a smart city or smart home, etc.

By way of example and not limitation, in embodiments of the present disclosure, the terminal device may also be a wearable device. The wearable device can also be called a wearable intelligent device, which is a general name of the wearable device developed by applying wearable technologies to intelligently design daily wears, such as glasses, gloves, watches, clothing and shoes. The wearable device is a portable device that is worn directly on a body or integrated into the user's clothes or accessories. The wearable device is a hardware device which can realize a powerful function through software support, data interaction and cloud interaction. A generalized wearable smart device includes devices with great function and a large size and may realize complete or partial functions without relying on smart phones, such as smart watches or smart glasses. The generalized wearable smart device further includes devices with dedicated application functions, which need to be used in conjunction with other devices like smart phones, such as various smart bracelets and smart accessories for vital signs monitoring.

The network device may further include a access network device and a core network device. That is, the wireless communication system further includes a plurality of core networks for communicating with access network devices. The access network device may be an evolutional node B (eNB or e-NodeB for short), a macro base station, a micro base station (also referred to as a "small base station"), a pico base station, an access point (AP), a transmission point (TP) or a new generation Node B (gNodeB) in a long-term evolution (LTE) system, a next-generation (mobile communication) system (i.e., an NR system) or an authorized auxiliary access long-term evolution (LAA-LTE) system.

In embodiments of the present disclosure, the network device may be a device for communicating with a mobile device. The network device may be an AP in a WLAN, a Base Transceiver Station (BTS) in global system of mobile communication (GSM) or code division multiple access (CDMA), a base station (NodeB, NB) in wideband code division multiple access (WCDMA), an eNB or eNodeB in LTE, a relay station, an AP, a vehicle-mounted device, a wearable device, a network device (gNB) in an NR network, a network device in a future evolved PLMN network or a network device in a non-terrestrial network (NTN), etc.

By way of example and not limitation, in embodiments of the present disclosure, the network device may have mobility characteristics. For example, the network device may be a mobile device. Alternatively, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, and the like. Alternatively, the network device may also be a base station arranged on the land, water and the like.

In embodiments of the present disclosure, the network device may provide services for a cell, and the terminal device communicates with the network device through transmission resources (e.g., frequency domain resources or spectrum resources) used by the cell. The cell may be a cell corresponding to a network device (e.g., a base station). The cell may belong to a macro base station, or belong to a base station corresponding to small cell. The small cell may include a metro cell, a micro cell, a pico cell, a femto cell, etc. The small cell has a small coverage area and a low transmission power, and is suitable for providing high-speed data transmission services.

It should be understood that a device having a communication function in a network/system in embodiments of the present disclosure may be referred to as a communication device. Taking the communication system illustrated in FIG. 1 as an example, the communication device may include a network device and a terminal device having a communication function, and the network device and the terminal device may be specific devices in embodiments of the present disclosure, which will not be elaborated herein again. The communication device may further include other devices in the communication system such as network controllers, mobility management entities and other network entities, which are not limited in embodiments of the present disclosure.

The technical solution of the embodiments of the present disclosure may be applied to various communication systems. For example, a GSM system, a CDMA system, a WCDMA system, a general packet radio service (GPRS), an LTE system, an advanced LTE (LTE-A) system, an NR system, an evolution system of NR system, an LTE-based access to unlicensed spectrum (LTE-U) system on unlicensed spectrums, an NR-based access to unlicensed spectrum (NR-U) system on unlicensed spectrums, an NTN system, an universal mobile telecommunications system (UMTS), a WLAN, a Wireless Fidelity (Wi-Fi), a 5th-Generation (5G) system or other communication systems.

Generally, traditional communication systems support a limited number of connections, and are easy to be implemented. However, with the development of communication technologies, mobile communication systems will not only support traditional communication, but also support, for example, a device to device (D2D) communication, a machine to machine (M2M) communication, a machine type communication (MTC), a vehicle to vehicle (V2V) communication, or a vehicle to everything (V2X) communication, etc. Embodiments of the present disclosure may also be applied to these communication systems.

The communication system in embodiments of the present disclosure may be applied to scenarios such as carrier aggregation (CA), dual connectivity (DC) scene and stand-alone (SA) network distribution.

It should be understood that the "indication" in embodiments of the present application may be a direct indication, an indirect indication, or may be indicative of an association relationship. For example, A indicating B may mean that A directly indicating B, for example, B may be obtained through A. A indicating B may also mean that A indirectly indicating B, for example, A indicates C, and B may be obtained through C. A indicating B may also mean that there is an association relationship between A and B.

In description of embodiments of the present disclosure, the term "correspondence" may mean a direct correspondence or an indirect correspondence, or an association relationship, or an relationship of indicating and being indicated, or configuring and being configured, etc.

Alternatively, indication information in embodiments of the present disclosure includes physical layer signaling, such as at least one of downlink control information (DCI), RRC signaling, or media access control element (MAC CE).

Alternatively, high layer parameters or high layer signaling in embodiments of the present disclosure include at least one of RRC signaling or MAC CE.

First Embodiment

Figure 2:
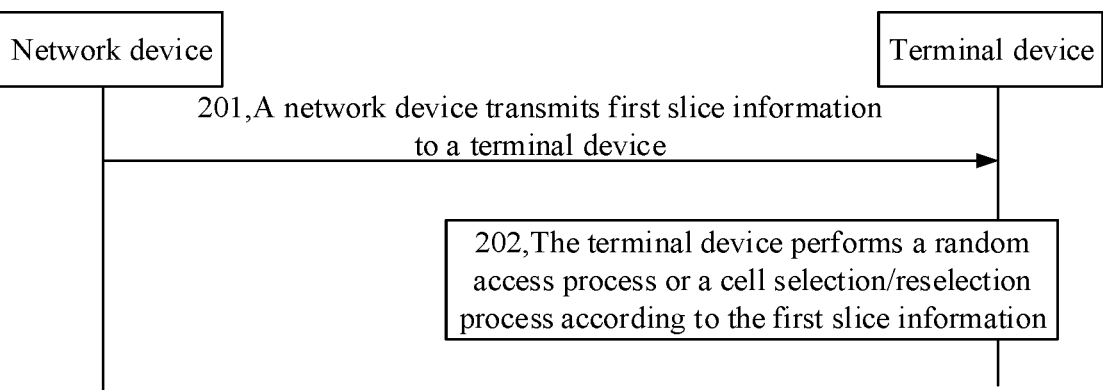
FIG. 2 is a schematic diagram of a method for indicating slice information provided in an embodiment of the present disclosure.

As illustrated in FIG. 2, an embodiment of the present disclosure provides a method for indicating slice information, the method includes following operations.

At an operation 201, a network device transmits first slice information to a terminal device.

Correspondingly, the terminal device receives the first slice information.

Alternatively, the first slice information may be carried in at least one of: a first SIB, a dedicated RRC message or a non-access stratum (NAS) message.

Accordingly, the network device may transmit the first slice information to the terminal device through at least one of the first SIB, the dedicated RRC message or the NAS message.

Alternatively, the first SIB is system information (SI) of a specific type or an SIB of a specific type.

Alternatively, at least one of the following applies to the method: the SI of the specific type is one of existing SI types, or the SI of the specific type is an SI type newly added in a protocol.

Alternatively, at least one of the following applies to the method: the SIB of the specific type is one of existing SIB types, or the SIB of the specific type is an SIB type newly added in a protocol.

Alternatively, at least one of the following applies to the method: the first SIB is a second specific SIB, and the second specific SIB is at least one SIB in existing SIBs, or the second specific SIB is at least one SIB newly added in a protocol.

Alternatively, a broadcast status of the first SIB is set as not broadcasting (notBroadcasting).

Alternatively, the terminal device may transmit an SIB request message to the network device. The SIB request message is configured to request the network device to transmit the first SIB or the first slice information.

Alternatively, the network device may also indicate slice information to the terminal device in a segmentation indication manner.

Alternatively, the first slice information is complete slice information.

Alternatively, the first slice information is a segment of complete slice information, and the complete slice information includes a plurality of segments of slice information.

Alternatively, the first slice information is complete slice information, and the complete slice information includes a plurality of segments of slice information.

Alternatively, the first SIB is a complete SIB.

Alternatively, the first SIB is a complete SIB, and the first SIB includes a plurality of SIB segments.

Alternatively, the first SIB is an SIB segment of a complete SIB.

Alternatively, if the first slice information is the complete slice information, the operation of receiving the first slice information from the network device includes: receiving the first slice information from the network device, to receive the complete slice information.

Alternatively, the first SIB is a complete SIB, and the first SIB carries the first slice information.

Alternatively, the method further includes receiving segmentation indication information from the network device.

The segmentation indication information indicates whether the first slice information is the complete slice information or whether the first slice information is segmented; and/or the segmentation indication information indicates whether the first SIB is the complete SIB or whether the first SIB is segmented.

Alternatively, the first slice information is the complete slice information, and the first slice information includes: a plurality of pieces of sub-slice information of a plurality of segments.

The operation of receiving the first slice information from the network device includes receiving each of the plurality of pieces of sub-slice information of the plurality of segments, to receive the complete slice information.

Alternatively, the first SIB is the complete SIB, and the first SIB carries one piece of sub-slice information in the first slice information.

Alternatively, the first SIB is a complete SIB, and the first SIB is segmented into a plurality of SIB segments, and each SIB segment carries one piece of sub-slice information in the first slice information.

Alternatively, the method further includes receiving segmentation indication information from the network device.

The segment indicating information indicates whether currently received sub-slice information is a last segment of the complete slice information; and/or the segmentation indication information indicates whether currently received information is a last segment of the complete SIB.

Alternatively, the method further includes receiving segmentation indication information from the network device and the segmentation indication information indicates at least one of following cases.

First case: the first slice information is complete slice information, or whether the first slice information is segmented.

Second case: the first SIB is a complete SIB, or whether the first SIB is segmented.

Third case: whether currently received slice information is the last segment of complete slice information.

Fourth case: whether currently received information is the last segment of a complete SIB.

Fifth case: a number of segments of the first SIB, or a number of segments of the first slice information.

Alternatively, the terminal device may further receive the number of segments of the complete slice information from the network device.

Alternatively, the terminal device may further receive the number of segments of the complete SIB from the network device.

Alternatively, the operation of the network device indicating the slice information to the terminal device may include following possible situations.

First situation: the first slice information is complete slice information.

Alternatively, the network device may transmit the segmentation indication information to the terminal device, and accordingly, the terminal device may receive the segmentation indication information from the network device.

The segmentation indication information indicates that the first slice information is the complete slice information or the segmentation indication information indicates that the first slice information is not segmented.

Alternatively, in this situation, the number of segments of the complete slice information received by the terminal device from the network device may be 1 or 0.

Alternatively, in this situation, the terminal device may not receive the number of segments of the complete slice information from the network device. That is, the number of segments of the complete slice information may not occur.

Alternatively, the terminal device may not receive the segmentation indication information from the network device, i.e., there is no segmentation.

In this situation, the terminal device receives the first slice information, i.e., the terminal device receives entire slice information in complete slice information.

If the first slice information is the complete slice information, the operation that the terminal device receives the first slice information from the network device includes: receiving the first slice information from the network device, to receive the complete slice information.

Alternatively, with regard to the situation 1, when the terminal device receives the first slice information, the terminal device may determine whether the first slice information is segmented, and if it is determined that the first slice information is not segmented, the terminal device determines that the first slice information is the complete slice information.

Alternatively, whether the first slice information is segmented may be determined based on whether the segmentation indication information is received or determined based on the received segmentation indication information.

Second situation: the first slice information is a segment of the complete slice information, and the complete slice information includes a plurality of segments of the slice information.

The operation that the terminal device receives the first slice information means that the terminal device receives a part of the complete slice information.

Alternatively, the network device may transmit the segmentation indication information to the terminal device, and accordingly, the terminal device may receive the segmentation indication information from the network device.

The segmentation indication information indicates whether the currently received slice information (i.e., the first slice information) is the last segment of the complete slice information.

In this situation, the number of segments of the complete slice information received by the terminal device from the network device may be n, and n is greater than or equal to 1, or n is greater than or equal to 2.

Assuming that the complete slice information includes a first segment of the slice information and a second segment of the slice information, when the received first slice information is the first segment of the slice information, it is necessary to continue to receive the second segment of the slice information, so as to obtain entire slice information of the complete slice information.

Alternatively, for the second situation, when the terminal device receives the first slice information, the terminal device determines whether the first slice information is segmented or whether the first slice information is a segment of the slice information. If it is determined that the first slice information is the segment of the slice information, the terminal device determines that the first slice information is not complete slice information.

Alternatively, whether the first slice information is segmented or whether the first slice information is the segment of the slice information may be determined based on whether the segmentation indication information is received and/or determined based on the received segmentation indication information.

Third situation: the first slice information is complete slice information, and the complete slice information includes a plurality of segments of the slice information.

The terminal device may receive the complete slice information (i.e., the first slice information) by receiving the plurality of segments of the slice information.

Alternatively, the network device may transmit the segmentation indication information to the terminal device, and accordingly, the terminal device may receive the segmentation indication information from the network device.

The segmentation indication information indicates whether the currently received slice information (i.e., a segment of the currently received slice information) is the last segment of the complete slice information.

In this situation, the number of segments of the complete slice information received by the terminal device from the network device may be n, and n is greater than or equal to 1, or n is greater than or equal to 2.

Alternatively, for the third situation, the first slice information is the complete slice information, and the first slice information includes a plurality pieces of sub-slice information of the plurality of segments.

The operation of receiving the first slice information from the network device includes receiving each of the plurality of pieces of sub-slice information of the plurality of segments, to receive the complete slice information.

When the terminal device receives the first slice information, the terminal device determines whether the first slice information is segmented, and if it is determined that the first slice information is segmented, the terminal device determines the number of segments.

Alternatively, whether the first slice information is segmented and the number of segments may be determined based on whether the segmentation indication information is received, and/or determined based on the received segmentation indication information.

Fourth situation: the first SIB is a complete SIB.

Alternatively, the first SIB may further carry a segment of the complete slice information. The operation that the terminal device receives the first SIB means that the terminal device receives the segment of the complete slice information, and it is necessary to receive other SIBs, to receive other segments of the complete slice information.

The segmentation indication information indicates whether the first SIB is a complete SIB or whether the first SIB is segmented.

Alternatively, in this situation, the number of segments of the complete SIB received by the terminal device from the network device may be 1 or 0.

Alternatively, in this situation, the terminal device may not receive the number of segments of the complete SIB from the network device. That is, the number of segments of the complete SIB may not occur.

Alternatively, the terminal device may not receive the segmentation indication information from the network device, i.e., the first SIB is a complete SIB not being segmented.

Alternatively, for the fourth situation, the first SIB is a complete SIB. In this situation, the first SIB carries the first slice information (in this situation, the first slice information is the complete slice information). The operation that the terminal device receives the first SIB means that the terminal device receives the complete slice information.

Alternatively, the first SIB is the complete SIB. In this situation, the first SIB carries a segment (i.e., the sub-slice information) of the first slice information. The operation that the terminal device receives the first SIB means that the terminal device receives a piece of sub-slice information of the first slice information.

Alternatively, when the terminal device receives the first SIB, the terminal device may determine whether the first SIB is segmented, and if it is determined that the first SIB is not segmented, the terminal device determines that the first SIB is the complete slice information.

Alternatively, whether the first SIB is segmented may be determined based on whether the segmentation indication information is received, and/or determined based on the received segmentation indication information.

Fifth situation: the first SIB is a complete SIB, and the first SIB includes the plurality of SIB segments.

The terminal device may receive the complete SIB (i.e., the first SIB) by receiving a plurality of segments of the SIB (referred to as SIB segments).

Alternatively, for the situation that the first slice information includes a plurality of segments of the slice information, each SIB segment may carry a segment of the first slice information.

Alternatively, the network device may transmit the segmentation indication information to the terminal device, and accordingly, the terminal device may receive the segmentation indication information from the network device.

The segmentation indication information indicates whether a currently received SIB (i.e., a currently received SIB segment) is the last segment of a complete SIB.

In this situation, the number of segments of the complete SIB received by the terminal device from the network device may be n, and n is greater than or equal to 1, or n is greater than or equal to 2.

Alternatively, for the fifth situation, the first SIB is the complete SIB, the first SIB is segmented into the plurality of SIB segments, and each SIB segment carries a piece of sub-slice information of the first slice information.

Alternatively, after the terminal device receives the first SIB, the terminal device may determine whether the first SIB is segmented, and when the terminal device determines that the first SIB is segmented, the terminal device further determines the number of segments.

Alternatively, whether the first SIB is segmented and the number of segments may be determined based on whether the segmentation indication information is received, and/or determined based on the received segmentation indication information.

Sixth situation: the first SIB is an SIB segment of a complete SIB.

The operation that the terminal device receives the first SIB means that the terminal device receives the SIB segment of the complete SIB.

In this situation, the first SIB may be understood as a segment of an existing SIB, or the first SIB may be understood as a segment of an SIB newly added in a protocol.

Alternatively, the network device may transmit the segmentation indication information to the terminal device, and accordingly, the terminal device may receive the segmentation indication information from the network device.

The segmentation indication information indicates whether a currently received SIB (i.e., the first SIB) is the last segment of the complete SIB.

In this situation, the number of segments of the complete slice information received by terminal device from the network device may be n, and n is greater than or equal to 1, or n is greater than or equal to 2.

Assuming that the complete slice information includes an SIB segment 1 and an SIB segment 2. When the received first SIB is the SIB segment 1, it is necessary to continue to receive the SIB segment 2, so as to obtain the complete SIB.

Alternatively, for the sixth situation, when the terminal device receives the first SIB, the terminal device may determine whether the first SIB is segmented or whether the first SIB is a segment of an SIB. If it is determined that the first SIB is the segment of the SIB, it is determined that the first SIB is not a complete SIB.

Alternatively, whether the first SIB is segmented or whether the first SIB is the segment of the SIB may be determined based on whether the segmentation indication information is received, and/or determined based on the received segmentation indication information.

Alternatively, in the embodiments of the present disclosure, the network device may further transmit first indication information to the terminal device, and the first indication information indicates at least one of the following cases.

A. Whether to Transmit the First Slice Information.

Alternatively, the first indication information indicates to transmit the first slice information, or the first indication information indicates not to transmit the first slice information.

After the terminal device receives the information indicating whether to transmit the first slice information, the terminal device can determine whether the network device indicates the first slice information to the terminal device.

B. Receiving the First Slice Information Through a First Message.

Alternatively, when the first indication information received by the terminal device indicates to receive the first slice information through the first message, the terminal device can determine that the first slice information may be received by decoding the first message.

C. Whether to Receive the First Slice Information Through the First Message.

Alternatively, the first indication information indicates to receive the first slice information through the first message, or the first indication information indicates not to receive the first slice information through the first message.

Alternatively, when the first indication information received by the terminal device indicates whether to receive the first slice information through the first message, the terminal device can determine whether to decode the first message to receive the first slice information.

D. Whether to Transmit the First SIB.

Alternatively, the first indication information indicates to transmit the first SIB, or the first indication information indicates non to transmit the first SIB.

After the terminal device receives information indicating whether to transmit the first SIB, the terminal device can determine whether the network device indicates the first SIB to the terminal device.

E. Receiving the First SIB Through a Second Message.

Alternatively, when the first indication information received by the terminal device indicates to receive the first SIB through the second message, the terminal device can determine that the first SIB may be received by decoding the second message.

F. Whether to Receive the First SIB Through the Second Message.

Alternatively, the first indication information indicates to receive the first SIB through the second message, or the first indication information indicates not to receive the first SIB through the second message.

Alternatively, when the first indication information received by the terminal device indicates whether to receive the first SIB through the second message, the terminal device can determine whether to decode the second message to receive the first SIB.

The first slice information may include following situations.

(1) the First Slice Information Includes at Least One First Slice Identification.

Alternatively, a slice identification may be S-NSSAI or a slice/service type (SST).

The slice identification may be any slice identification in the embodiments of the present disclosure. For example, the slice identification may be the first slice identification, or a second slice identification.

Alternatively, each of the at least one first slice identification is an identification of a slice.

Alternatively, each of the at least one first slice identification is an identification of a group of slices.

Alternatively, each of the at least one first slice identification is an identification corresponding to a slice. Alternatively, the identification may be an access category, that is, each of the at least one first slice identification is an access category corresponding to a slice.

Alternatively, each of the at least one first slice identification is an identification corresponding to a group of slices. Alternatively, the identification may be an access category, that is, each of the at least one first slice identification is an access category corresponding to a group of slices.

(2) the First Slice Information Includes at Least One Piece of First Frequency Point Information.

(3) The first slice information includes at least one first slice identification and at least one piece of first frequency point information.

(4) The first slice information includes at least one first slice identification and at least one frequency point priority.

(5) The first slice information includes at least one piece of first frequency point information and at least one frequency point priority.

(6) The first slice information includes at least one first slice identification, at least one piece of first frequency point information and at least one frequency point priority.

Alternatively, a slice identification indicates at least one network slice or at least one group of network slices.

Alternatively, a slice identification corresponds to at least one piece of frequency point information.

Alternatively, the at least one piece of frequency point information (including the above at least one piece of the first frequency point information or at least one piece of second frequency point information described below) is a frequency point list.

That is, in embodiments of the present disclosure, the at least one piece of the first frequency point information may be a frequency point list, and the at least one piece of the second frequency point information may also be a frequency point list.

Alternatively, the frequency point information corresponding to a slice identification may include at least one frequency point priority.

Alternatively, a slice identification is indicated by a slice index, or a group of slice identifications is indicated by a slice index, or a group of slices is indicated by a slice index or a slice group index.

Alternatively, the slice index or the slice group index may be represented as an index.

Alternatively, the terminal device may obtain a fourth correspondence between the slice identification and the slice index, or between the identification of the group of slices and the slice group index, or the identification of the group of slices and the slice index.

Alternatively, the fourth correspondence is indicated by at least one of: a dedicated RRC message, system broadcasting or an NAS message, or is predefined in a protocol.

Alternatively, the network device may indicate the fourth correspondence to the terminal device by indication of at least one of the RRC dedicated message, the system broadcasting or the NAS message, so that the terminal device can obtain the fourth correspondence between the slice identification and the slice index.

Alternatively, the fourth correspondence may also be indicated by predefining in a communication protocol (i.e., predefining in a protocol), so that the terminal device can obtain the fourth correspondence between the slice identification and the slice index.

In embodiments of the present disclosure, the first slice information may be indicated by the following two indication manners.

In a first manner, the at least one first slice indication and a respective piece of first frequency point information corresponding to each of the at least one first slice indication are indicated. That is, the slice is indicated at first and then the frequency point is indicated.

The first manner corresponds to a specific indication manner in the fourth embodiment and the fifth embodiment described below.

In a second manner, the at least one piece of first frequency point information and a respective first slice identification corresponding to each of the at least one piece of the first frequency point information are indicated. That is, the frequency point is indicated at first and then the slice is indicated.

The second manner corresponds to a specific indication manner in the sixth embodiment described below.

For the above different situations (1) to (6) for indicating the first slice information, there may be various implementations for indicating other slice related information, and the following is an exemplary description of alternative implementations for the above several situations.

Alternative implementation A

For the situation (3), the first slice information includes the at least one first slice identification and the at least one piece of the first frequency point information. The method further includes following operations.

The network device transmits a first correspondence to the terminal device, and accordingly, the terminal device receives the first correspondence from the network device.

The first correspondence is a correspondence between the at least one first slice identification and the at least one piece of the first frequency point information.

Alternatively, the first correspondence may be included in the first slice information.

Alternatively, the first slice information includes the at least one first slice identification, the at least one piece of the first frequency point information and the first correspondence.

Alternatively, the network device may transmit the at least one first slice identification, the at least one piece of the first frequency point information and the first correspondence to the terminal device through a same message.

Alternatively, the network device may transmit the at least one first slice identification, the at least one piece of the first frequency point information and the first correspondence to the terminal device through different messages.

Alternative Implementation B

For the situation (1), the first slice information includes the at least one first slice identification.

Alternatively, a sequence of at least one frequency point corresponding to the at least one first slice identification is in a one-to-one correspondence with a sequence of at least one frequency point in a specific message.

Alternatively, the specific message can be an SIB or RRC signaling, etc.

Alternatively, the specific message may be a first specific SIB or a first specific RRC message.

Alternatively, the first specific SIB may be an SIB4 or an RRC release message (RRCrelease).

Alternatively, the first specific SIB may further be a message carrying frequency point information other than the SIB4.

Alternative Implementation C

For the above situation (1), the first slice information includes the at least one slice identification. The method further includes following operations.

The network device transmits at least one piece of second frequency point information and/or a second correspondence to the terminal device. Accordingly, the terminal device receives the at least one piece of the second frequency point information and/or the second correspondence from the network device.

The second correspondence is a correspondence between the at least one first slice identification and the at least one piece of the second frequency point information.

Alternative Implementation D

For the above situation (2), the first slice information includes the at least one piece of first frequency point information. The method further includes following operations.

The network device transmits at least one second slice identification and/or a third correspondence to the terminal device, and accordingly, the terminal device receives the at least one second slice identification and/or the third correspondence from the network device.

Alternatively, each of the at least one first slice identification is an identification of a slice.

Alternatively, each of the at least one first slice identification is an identification of a group of slices.

Alternatively, each of the at least one first slice identification is an identification corresponding to a slice. Alternatively, the identification may be an access category, that is, each of the at least one first slice identification is an access category corresponding to a slice.

Alternatively, each of the at least one first slice identification is an identification corresponding to a group of slices. Alternatively, the identification may be an access category, that is, each of the at least one first slice identification is an access category corresponding to a group of slices.

The third correspondence is a correspondence between the at least one second slice identification and the at least one piece of the first frequency point information.

Alternative Implementation E

For the situation (1), (2) or (3), the method further includes the following operation.

Priority information of at least one frequency point indicated by at least one piece of frequency point information from the network device.

In an alternative implementation F, the first slice information at least includes at least one frequency point priority.

Alternatively, the network device may transmit at least one piece of second frequency point information and/or a fifth correspondence to the terminal device, and accordingly, the terminal device receives the fifth correspondence from the network device.

The fifth correspondence may be a correspondence between the at least one piece of the second frequency point information and the at least one frequency point priority.

Alternatively, the fifth correspondence may also be included in the first slice information.

Alternatively, the first slice information may include the at least one piece of the second frequency point information, the at least one frequency point priority and the fifth correspondence.

Alternatively, the network device may transmit the at least one piece of the second frequency point information, the at least one frequency point priority and the fifth correspondence to the terminal device through a same message.

Alternatively, the network device may transmit the at least one piece of the second frequency point information, the at least one frequency point priority and the fifth correspondence to the terminal device through different messages.

Alternatively, the network device may transmit a sixth correspondence and/or at least one second slice identification to the terminal device, and accordingly, the terminal device receives the sixth correspondence from the network device.

The sixth correspondence may be a correspondence between the at least one second slice identification and at least one frequency point priority.

Alternatively, the sixth correspondence may also be included in the first slice information.

Alternatively, the first slice information may include the at least one second slice identification, the at least one frequency point priority and the sixth correspondence.

Alternatively, the network device may transmit the at least one piece of the second frequency point information, the at least one frequency point priority and the sixth correspondence to the terminal device through a same message.

Alternatively, the network device may transmit the at least one piece of the second frequency point information, the at least one frequency point priority and the sixth correspondence to the terminal device through different messages.

Similar to the fourth correspondence, the first correspondence, the second correspondence, the third correspondence, the fifth correspondence and the sixth correspondence may be indicated by at least one of a dedicated RRC message, system broadcasting or an NAS message, or is predefined in a protocol.

It should be noted that, the above alternative implementations A to F are only exemplary implementations. The slice related information (which may be the first slice information and/or indication information of other slice information) in embodiments of the present disclosure may be one of a slice identification, frequency point information, a frequency point priority, a correspondence or a combination thereof (any one of the second correspondence, the third correspondence, the fourth correspondence, the fifth correspondence and the sixth correspondence). Specific forms of the slice related information are not limited in embodiments of the present disclosure.

At an operation 202, the terminal device performs a random access process or a cell selection/reselection process according to the first slice information.

1) The terminal device may perform a random access process according to the first slice information.
2) The terminal device may perform a cell selection according to the first slice information.
3) The terminal device may perform a reselection process according to the first slice information.

The random access process may include selecting RACH resources for accessing.

It should be noted that, in embodiments of the present disclosure, another random access process may be performed according to the first slice information, which is not specifically limited in embodiments of the present disclosure.

Embodiments of the present disclosure provide a scheme for indicating slice information to the terminal device and a plurality of possible indication manners, so that the slice information can be indicated to the terminal device flexibly.

Second Embodiment

The network device indicates the slice information (which may be the first slice information in the first embodiment) to the UE through an SIB or a dedicated RRC message. The slice information carries at least one of the slice identification or corresponding frequency point information.

Alternatively, the SIB may be a specific SIB (which may be the first specific SIB in the first embodiment), and the SIB is dedicated to broadcast a slice supported by the current cell and configuration information related to the slice.

Alternatively, the SIB may be of a specific type. The specific type may be one of existing system information (SI) types/SIB types, or the specific type may be a newly added SI type/SIB type.

Alternatively, the terminal device requests, in an on-demand manner, the network to transmit the slice information. The network device transmits the slice information to the UE through the SIB or the dedicated RRC message.

Alternatively, a broadcast status of SIB (si-BroadcastStatus) may be set as not broadcasting (notBroadcasting). Accordingly, when the terminal device transmits an SIB request to the network device to request the SIB, the network device may transmit the SIB or the dedicated RRC message to the terminal device.

Alternatively, the SIB may be indicated to the UE in a segmented manner.

Alternatively, the slice information may be indicated to the UE in a segmented manner.

Alternatively, the slice information may be indicated to the terminal device in a segmented manner. When a segment is indicated, a type of the segment and/or a total number of segments (i.e., a segment number) may be indicated at the same time.

The type of segment may be indicated by segmentation indication information. The segmentation indication information may indicate that the type of the segment is not the last segment (notLastSegment), or the segmentation indication information may indicate that the type of the segment is the last segment (lastSegment).

After receiving the slice information indicated by the network, the terminal device may perform subsequent operations according to the slice information, such as the cell selection, the cell reselection or selection of access RACH resources, etc.

In the embodiment, a method for indicating the slice information to the UE is provided. The indication information is indicated to the UE by an on-demand manner and/or a segmented manner, thereby reducing signaling overhead for providing the slice information. This embodiment may be used in conjunction with any one of the embodiments.

Third Embodiment

The network device may indicate the slice information to the terminal device through the SIB, the dedicated RRC message or the NAS message.

The slice information carries a slice identification (which may be at least one first slice identification in the first embodiment) and/or frequency point information corresponding to the slice identification (which may be at least one piece of first frequency point information in the first embodiment).

The frequency point information is a frequency point or a frequency point list supporting the slice identification.

Further, priority information of the frequency point corresponding to the slice identification may also be included in the slice information.

The slice identification is indicated by an index.

Alternatively, a relationship between the slice identification and the index (i.e., the fourth correspondence in the first embodiments) can be indicated by an RRC dedicated message, system broadcasting or an NAS message.

Alternatively, the relationship between the slice identification and the index may be indicated in a manner of predefining in a protocol (prewriting in the protocol). In embodiments of the present disclosure, the slice identification may be corresponded or bound to the index one by one.

Alternatively, the slice identification may be an identification of a slice, an identification of a plurality of slices or an identification of one or more groups of slices.

Alternatively, the relationship between the slice identification and the index may be indicated by at least one of an RRC message, an SIB or an NAS message, or is predefined in a protocol (i.e., prewritten in the protocol).

For example, the relationship between the slice identification and the index is indicated by an RRC message or by broadcasting in system information. Exemplarily, a correspondence between the index and an S-NSSAI is indicated in the RRC message.

For example, the relationship between the slice identification and the index is indicated by an NAS message. Exemplarily, the core network determines the mapping relationship. The UE obtains the mapping relationship through the NAS message from the core network, and the base station obtains the mapping relationship through N2 signaling.

For example, the relationship between the slice identification and the index is indicated in a manner of predefining (i.e., prewriting in a protocol).

The UE receives the slice information indicated by the network, and performs subsequent operations according to the slice information, such as the cell selection or the cell reselection or selection of access RACH resources, etc.

Exemplarily, an information element (IE) corresponding to a specific indication manner a for indicating the correspondence between the index and the S-NSSAI is illustrated below. In the IE, a slice identification list (SliceIDlist) is indicated at first, the slice identification list includes at least one slice identification, and then, for each slice identification in the SliceIDlist, a correspondence between the slice identification (S-NSSAI or SST) and a slice index (SliceIndex) is further indicated.

The IE corresponding to the indication manner a is as follows:

```
SliceIDlist ::= SEQUENCE (SIZE (1.. maxSlice)) of SliceID
SliceID::= SEQUENCE {
    SliceID   S-NSSAI,
    SliceIndex   INTEGER (0.. maxSlice-1)   OPTIONAL   -- Need R
}
```

Exemplarily, an IE corresponding to a specific indication manner b for indicating the correspondence between the index and the S-NSSAI is illustrated below. In this IE, a slice identification list (SliceIDlist) and a slice index list (SliceIndexList) are indicated at first, and a slice identification S-NSSAI or SST in the SliceIDlist and a slice index in the SliceIndexList are indicated.

Further, It the IE, a field of the SliceIndexList or the SliceIDlist indicates the a slice index list supported. If the SliceIndexList exists, entries in the SliceIndexList are listed in a same order as the entries in the SliceIDlist, and the number of entries in the SliceIndexList is the same as the number of the entries in the SliceIDlist. That is, the entries in the SliceIndexList and the entries in the SliceIDlist are in a one-to-one correspondence.

The IE corresponding to the indication manner b is as follows:

```
SliceIDlist ::= SEQUENCE (SIZE (1.. maxSlice)) of S-NSSAI
SliceIndexList::= SEQUENCE (SIZE (1.. maxSlice)) of SliceIndex
S-NSSAI ::=            CHOICE{
    sst               BIT STRING (SIZE (8)),
    sst-SD            BIT STRING (SIZE (32)) OPTIONAL   -- Need R
}
Index ::=   INTEGER (0.. maxSlice-1)
```

The field description of SliceIndexList
List of slice index supported. If SliceIndexList is present, it shall contain the same number of entries, listed in the same order as in SliceIDlist.

The embodiment provides a specific manner of indicating the slice identification, and provides a method for reducing signaling overhead in the perspective of reducing signaling overhead of the slice identification, i.e., replacing the slice identification with the index. This embodiment may be used in conjunction with any one of the embodiments.

Fourth Embodiment

The embodiment of the present disclosure may indicate the slice related information in a manner for indicating the slice at first and then indicating the frequency point information, and the frequency point information is not omitted in this manner.

Alternatively, the network device may indicate the slice information to the terminal device by an SIB or RRC dedicated signaling.

The slice information (which may be the first slice information in the first embodiment) carries a slice identification and/or frequency point information corresponding to the slice identification.

Alternatively, the slice identification is indicated by the index. That is, the slice identification is corresponded or bound to the index one by one.

Alternatively, the slice identification may be an identification of one or more slices or an identification of one or more groups of slices.

Exemplarily, an indication manner c for indicating slice related information is illustrated. An IE corresponding to the indication manner c is illustrated below. In the IE, the frequency point information is not omitted. In this manner, PerSliceFrequencyPriorityList identifies a list of a priority (PerSliceFrequencyPriority) of each slice. For each PerSliceFrequencyPriority, the slice identification S-NSSAI (or sst-SD or sst) and the corresponding network slice frequency priority list (freqPriorityListNR) are indicated. In the freqPriorityListNR, the frequency carrierFreq and corresponding frequency priority information PerSliceFrequencyPriority and cellReselectionSubPriority are indicated.

The frequency priority information includes a carrier frequency (carrierFreq). i.e., a value of an absolute radio frequency channel number (ARFCN).

Alternatively, the frequency priority information may further include cell reselection priority information (cellReselectionPriority). Alternatively, the frequency priority information may further include cell reselection sub-priority information (cellReselectionSubPriority).

The PerSliceFrequencyPriority includes the slice identification S-NSSAI or SST of each slice and a frequency priority list (freqPriorityList) corresponding to each slice identification.

The IE corresponding to the indication manner c is as follows:

```
FreqPriorityNR ::=          SEQUENCE {
      carrierFreq          ARFCN-ValueNR,
      cellReselectionPriority        CellReselectionPriority, OPTIONAL      -- Need R
      cellReselectionSubPriority     CellReselectionSubPriority
OPTIONAL    -- Need R
   }
   S-NSSAI ::=              CHOICE{
      sst                BIT STRING (SIZE (8)),
      sst-SD             BIT STRING (SIZE (32)) OPTIONAL      -- Need R
   }
   PerSliceFrequencyPriorityList::=    SEQUENCE   (SIZE   (1..maxSlice))   of
PerSliceFrequencyPriority
   PerSliceFrequencyPriority::=        SEQUENCE {
         SliceID   S-NSSAI,
         freqPriorityListNR ::=        SEQUENCE (SIZE (1..maxFreq)) OF
FreqPriorityNR
   }
```

Exemplarily, an indication manner d for indicating slice related information is illustrated, and an IE corresponding to the indication manner d is illustrated below. Different from the IE corresponding to the indication manner c, the IE corresponding to the indication manner d uses the slice index rather than the slice identification S-NSSAI or SST.

The IE corresponding to the indication manner d is as follows:

```
FreqPriorityNR ::=          SEQUENCE {
      carrierFreq          ARFCN-ValueNR,
      cellReselectionPriority        CellReselectionPriority, OPTIONAL      -- Need R
      cellReselectionSubPriority     CellReselectionSubPriority
OPTIONAL    -- Need R
   }
   PerSliceFrequencyPriorityList::=    SEQUENCE   (SIZE   (1..maxSlice))   of
PerSliceFrequencyPriority
   PerSliceFrequencyPriority::=        SEQUENCE {
   SliceID   INTEGER (0.. maxSlice-1),
         freqPriorityListNR ::=        SEQUENCE (SIZE (1..maxFreq)) OF
FreqPriorityNR
}
```

Exemplarily, an indication manner e for indicating slice information is illustrated, and an IE corresponding to the indication manner e is illustrated below. In the IE, the frequency point information is not omitted, but the slice identification or the slice index is omitted. In this manner, PerSliceFrequencyPriorityList identifies a list of PerSliceFrequencyPriority. For each PerSliceFrequencyPriority, the slice identification is omitted, but for each PerSliceFrequencyPriority, the corresponding network slice frequency priority list freqPriorityListNR is indicated. In the freqPriorityListNR, the frequency carrierFreq and the corresponding frequency priority information PerSliceFrequencyPriority and cellReselectionSubPriority are indicated. To describe the PerSliceFrequencyPriorityList field, if the PerSliceFrequencyPriorityList exists, entries in the PerSliceFrequencyPriorityList are listed in a same order as the entries in the SliceIDlist, and the number of entries in the PerSliceFrequencyPriorityList is the same as the number of the entries in the SliceIDlist. That is, the indicated slice identification information in the PerSliceFrequencyPriorityList and the indicated slice identification information in the SliceIDlist are in a one-to-one correspondence.

The IE corresponding to the indication manner e is as follows:

```
SliceDlist ::= SEQUENCE (SIZE (1.. maxSlice)) of S-NSSAI
   FreqPriorityNR ::=          SEQUENCE {
      carrierFreq          ARFCN-ValueNR,
      cellReselectionPriority        CellReselectionPriority, OPTIONAL      -- Need R
      cellReselectionSubPriority     CellReselectionSubPriority
OPTIONAL    -- Need R
   }
   PerSliceFrequencyPriorityList::=    SEQUENCE   (SIZE   (1..maxSlice))   of
PerSliceFrequencyPriority
   PerSliceFrequencyPriority::=        SEQUENCE {
         freqPriorityListNR ::=        SEQUENCE (SIZE (1..maxFreq)) OF
FreqPriorityNR
   }
```

The field description of PerSliceFrequencyPriorityList

List of neighbouring carrier frequencies and frequency specific priority information for specific slice(s). If PerSliceFrequencyPriorityList is present, it shall contain the same number of entries, listed in the same order as in SliceIDlist.

In embodiments of the present disclosure, after receiving the slice information indicated by the network device, the terminal device may perform subsequent operations according to the slice information, such as the cell selection or the cell reselection, or selection of access RACH resources, etc.

In the embodiments, several manners for indicating the slice information not omitting frequency points are provided.

Fifth Embodiment

The embodiment may indicate the slice information in a manner of indicating the slice (by the slice identification) at first and then indicating the frequency point information, and the frequency point information may be omitted in this manner.

Alternatively, the base station may indicate the slice information to the terminal device through the SIB or the dedicated RRC signaling.

Alternatively, the slice identification is indicated by the index. That is, the slice identification is corresponded or bound to the index one by one.

Alternatively, the slice identification may be an identification of one or more slices or an identification of one or more groups of slices.

Alternatively, the frequency point information may be omitted when indicating the slice information. A sequence of frequency points corresponding to the actually indicated slices is in a one-to-one correspondence with a sequence of frequency points indicated in the SIB4, so that bits occupied by the frequency point information can be omitted, and the slice related information can be indicated by fewer bits.

Exemplarily, an indication manner f for indicating the slice information is illustrated below, and an IE corresponding to the indication manner f is illustrated as follows. In the IE, the frequency priority information (FrequencyPriorityForSliceList) of the slice list is indicated at first, and then a correspondence between the slice identification (S-NSSAI) and a slice priority list (slicePriorityListNR) for the frequency priority (FrequencyPriorityForSlice) of each slice in the FrequencyPriorityForSliceList is indicated. The slice priority list may include at least one piece of frequency priority information. The frequency priority information (FrequencyPriority) includes a cell reselection priority (cellReselectionPriority). Alternatively, the frequency priority information (FrequencyPriority) further includes a cell reselection sub-priority (cellReselectionSubPriority).

In this manner, the FrequencyPriorityForSliceList identifies the list of FrequencyPriorityForSlice. For each FrequencyPriorityForSlice, the slice identification and the slicePriorityListNR of a slice corresponding to the slice identification are indicated. In each FrequencyPriority in the slicePriorityListNR, the frequency point information is omitted.

In description of a domain of slicePriorityListNR, if the slicePriorityListNR exists, entries in the slicePriorityListNR are listed in a same order as the entries in the InterFreqCarrierFreqList in SIB4, and the number of entries in the slicePriorityListNR is the same as the number of the entries in the InterFreqCarrierFreqList in SIB4. That is, the frequency point information in the slicePriorityListNR and the frequency point information in the InterFreqCarrierFreqList is in a one-to-one correspondence.

The IE corresponding to the indication manner f is as follows:

```
FrequencyPriorityForSliceList::  = SEQUENCE  (SIZE
(1..maxSlice))   of FrequencyPriorityForSlice
FrequencyPriorityForSlice::=           SEQUENCE {
    SliceID   S-NSSAI,
    slicePriority ListNR        SEQUENCE (SIZE (1..maxfreq))
    FrequencyPriority
OPTIONAL    -- Need R
    }
FrequencyPriority::= SEQUENCE {
    cellReselectionPriority        CellReselectionPriority,
    cellReselectionSubPriority        CellReselectionSubPriority
OPTIONAL    -- Need R
    }
```

The field description of the slicePriorityListNR

List of neighbouring carrier frequencies and frequency specific priority information for specific slice(s). If slicePriorityListNR is present, it shall contain the same number of entries, listed in the same order as in InterFreqCarrierFreqList (without suffix) in SIB4.

It should be noted that the SIB4 may indicate inter-frequency cell reselection parameters including frequency point information. The specific IE in SIB4 is described as follows:

```
SIB4 ::=                       SEQUENCE {
    interFreqCarrierFreqList        InterFreqCarrierFreqList,
    lateNonCriticalExtension        OCTET STRING
OPTIONAL, ...,
    [[
    interFreqCarrierFreqList-v1610        InterFreqCarrierFreqList-v1610
OPTIONAL -- Need R
    ]]
}
InterFreqCarrierFreqList ::=              SEQUENCE (SIZE (1.. maxFreq)) OF
InterFreqCarrierFreqInfo
    InterFreqCarrierFreqList-v1610 ::=     SEQUENCE (SIZE (1..maxFreq)) OF
InterFreqCarrierFreqInfo-v1610
    InterFreqCarrierFreqInfo ::=          SEQUENCE {
    dl-CarrierFreq                     ARFCN-ValueNR,
    frequencyBandList                      MultiFrequencyBandListNR-SI
OPTIONAL, -- Cond Mandatory
    frequencyBandListSUL      MultiFrequencyBandListNR-SIB
OPTIONAL, -- Need R
    nrofSS-BlocksToAverage          INTEGER (2..maxNrofSS-BlocksToAverage)
```

-continued

```
OPTIONAL, -- Need S
    absThreshSS-BlocksConsolidation ThresholdNR
OPTIONAL, -- Need S
    smtc                                               SSB-MTC
OPTIONAL, -- Need S
    ssbSubcarrierSpacing        SubcarrierSpacing,
    ssb-ToMeasure               SSB-ToMeasure
OPTIONAL, -- Need S
    deriveSSB-IndexFromCell        BOOLEAN,
    ss-RSSI-Measurement            SS-RSSI-Measurement
OPTIONAL,
    q-RxLevMin                     Q-RxLevMin,
    q-RxLevMinSUL                  Q-RxLevMin
OPTIONAL, -- Need R
    q-QualMin                                          Q-QualMin
OPTIONAL, -- Need S
    p-Max                                              P-Max
OPTIONAL, -- Need S
    t-ReselectionNR             T-Reselection,
    t-ReselectionNR-SF                     SpeedStateScaleFactors
OPTIONAL, -- Need S
    threshX-HighP           Reselection Threshold,
    threshX-LowP            ReselectionThreshold,
    threshX-Q               SEQUENCE {
        threshX-HighQ           Reselection ThresholdQ,
        threshX-LowQ            ReselectionThresholdQ
    }
OPTIONAL, -- Cond RSRQ
    cellReselectionPriority     CellReselectionPriority
OPTIONAL, -- Need R
    cellReselectionSubPriority  CellReselectionSubPriority
OPTIONAL, -- Need R
    q-OffsetFreq            Q-OffsetRange
DEFAULT dB0,
    interFreqNeighCellList      InterFreqNeighCellList
OPTIONAL, -- Need R
    interFreqBlackCellList      InterFreqBlackCellList
OPTIONAL, -- Need R
    ...
```

In the IE corresponding to the SIB4, the underlined inter-frequency carrier frequency list (InterFreqCarrierFreqList) lists the frequency point information.

In this embodiment, after receiving the slice information indicated by the network device, the terminal device may perform subsequent operations according to the slice information. For example, the terminal device performs the cell selection or the cell reselection or selects access RACH resources, etc.

In this embodiment, a slice information indication manner omitting the frequency point information is provided. In the embodiment, the slice is indicated at first and then the frequency point is indicated, which reduces signaling overhead in the perspective of frequency. The embodiment of the present disclosure may be combined with the fourth embodiment to obtain a simplified slice information indication manner which omits the frequency point while replacing the slice identification with the slice index.

Sixth Embodiment

In this embodiment, the slice information may be indicated in a manner of indicating the frequency point information at first and then indicating the slice (by the slice identification).

The gNB indicates the slice information to the UE through the SIB or the dedicated RRC message or NAS information. The slice information carries the slice identification and/or the frequency point information corresponding to the slice identification.

Alternatively, the slice identification is indicated by the index. That is, the slice identification is corresponded or bound to the index one by one.

Alternatively, the slice identification may be an identification of one or more slices or an identification of one or more groups of slices.

Alternatively, the network device may indicate the slice information to the terminal device through an SIB, a dedicated RRC message or an NAS message.

Alternatively, the slice identification is indicated by the index. That is, the slice identification is corresponded or bound to the index are one by one.

Alternatively, the slice identification may be an identification of one or more slices or an identification of one or more groups of slices.

Alternatively, the frequency point information may be omitted when the slice information is indicated. A sequence of frequency points corresponding to the actually indicated slices is in a one-to-one correspondence with a sequence of frequency points indicated in the SIB4, so that bits occupied by the frequency point information can be omitted, and the slice related information can be indicated by fewer bits.

Exemplarily, an indication manner g for indicating the slice information is illustrated below. FrequencyPriorityForSliceList is a list of FrequencyPriorityForSlice. Frequency point information and slice related information slicePriorityListNR corresponding to the frequency point information are provided in the FrequencyPriorityForSlice. The slice identification (S-NSSAI or SST) and priority information (cellReselectionPriority, cellReselectionSubPriority) are provided in each FreqPriorityNRSlice.

```
FrequencyPriorityForSliceList::=   SEQUENCE   (SIZE
(1..  maxFreq))  of FrequencyPriorityForSlice
    FrequencyPriorityForSlice::=            SEQUENCE {
    carrierFreq                ARFCN-ValueNR
    slicePriority ListNR            SEQUENCE (SIZE (1.. maxSlice))
    FreqPriorityNRSlice
    }
    FreqPriorityNRSlice::= SEQUENCE {
        SliceID   S-NSSAI,
        cellReselectionPriority           CellReselectionPriority,
        cellReselectionSubPriority        CellReselectionSubPriority
    OPTIONAL   -- Need R
    }
```

Exemplarily, the indication manner g for indicating the slice information is illustrated below, and an IE corresponding to the indicating manner g is illustrated below. Different from the IE corresponding to the indication manner f, the IE corresponding to the indication manner g omits the indication of frequency point information.

Further, the description of adomain of FrequencyPriorityForSliceList is given. If the FrequencyPriorityForSliceList exists, entries in the FrequencyPriorityForSliceList are listed in a same order as the entries in the InterFreqCarrierFreqList in the SIB4, and the number of entries in the FrequencyPriorityForSliceLis tis the same as the number of the entries in the SIB4. That is, the frequency points in the FrequencyPriorityForSliceList and the frequency points indicated in the InterFreqCarrierFreqList in the SIB4 are in a one-to-one correspondence.

```
FrequencyPriorityForSliceList::=   SEQUENCE   (SIZE
(1..  maxFreq))  of FrequencyPriorityForSlice
    FrequencyPriorityForSlice::=           SEQUENCE {
        slicePriority ListNR               SEQUENCE (SIZE (1.. maxSlice))
    FreqPriorityNRSlice
    }
    FreqPriorityNRSlice::= SEQUENCE {
        SliceID   S-NSSAI,
        cellReselectionPriority           CellReselectionPriority,
        cellReselectionSubPriority        CellReselectionSubPriority
    OPTIONAL   -- Need R
    }
```

The field description of the FrequencyPriorityForSliceList List of neighbouring carrier frequencies and frequency specific priority information for specific slice(s). If FrequencyPriorityForSliceList is present, it shall contain the same number of entries, listed in the same order as in InterFreqCarrierFreqList (without suffix) in SIB4.

Exemplarily, an indication manner h of the slice information is illustrated below, and an IE corresponding to the indication manner h is illustrated below. Different from the IE corresponding to the indication manner g, the IE corresponding to the indication manner h indicates the slice information by using the slice index rather than the slice identification.

The IE corresponding to the indication manner h is as follows:

```
FrequencyPriorityForSliceList::=   SEQUENCE   (SIZE
(1..  maxFreq))  of FrequencyPriorityForSlice
    FrequencyPriorityForSlice::=           SEQUENCE {
    slicePriority ListNR            SEQUENCE (SIZE (1.. maxSlice))
    FreqPriorityNRSlice
    }
    FreqPriorityNRSlice::= SEQUENCE {
    SliceIndex   SliceIndex,
```

-continued

```
        cellReselectionPriority           CellReselectionPriority,
        cellReselectionSubPriority        CellReselectionSubPriority
    OPTIONAL   -- Need R
    }
```

The field description of the FrequencyPriorityForSliceList List of neighbouring carrier frequencies and frequency specific priority information for specific slice(s). If FrequencyPriorityForSliceList is present, it shall contain the same number of entries, listed in the same order as in InterFreqCarrierFreqList (without suffix) in SIB4.

```
SliceIDlist ::= SEQUENCE (SIZE (1.. maxSlice)) of SliceID
SliceID::= SEQUENCE {
    SliceID       S-NSSAI,
    SliceIndex   INTEGER (0.. maxSlice-1)       OPTIONAL   -- Need R
}
```

Exemplarily, other manners for indicating the slice information may further be provided.

For example, the frequency point information is not omitted, and the index identification is used rather than using the slice identification. That is, different from the indication manner h, the frequency point information is carried.

Specifically, the following fields may be added to the original indication manner h to indicate the frequency point information: carrierFreq ARFCN-ValueNR.

In another example, the frequency point information is not omitted, and the slice index or the slice identification is omitted. That is, different from the indication manner h, the frequency point information is carried, and the slice index is omitted.

In another example, the frequency point information is omitted and the slice index or the slice identification is omitted. That is, different from the indication manner h, the slice index is omitted.

In the embodiment, after receiving the slice information indicated by the network device, the terminal device may perform subsequent operations according to the slice information, for example, the terminal device performs the cell selection or the cell reselection or selects access RACH resources, etc.

In this embodiment, a method for indicating slice information that omits the frequency point information is provided. This embodiment adopts a manner of indicating the frequency point information before indicating the slice information, so that the signaling overhead can be reduced.

Figure 3:
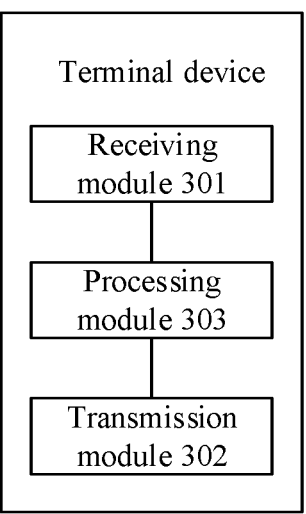
FIG. 3 is a structural schematic diagram of a terminal device provided in an embodiment of the present disclosure.

As illustrated in FIG. 3, an embodiment of the present disclosure provides a terminal device which includes a receiving module 301.

The receiving module is configured to receive first slice information from a network device. The first slice information includes at least one of: at least one first slice identification or at least one piece of first frequency point information.

Alternatively, each of the at least one first slice identification is an identification of a slice.

Alternatively, each of the at least one first slice identification is an identification of a group of slices.

Alternatively, each of the at least one first slice identification is an identification corresponding to a slice.

Alternatively, each of the at least one first slice identification is an identification corresponding to a group of slices.

Alternatively, the first slice information includes the at least one first slice identification and the at least one piece of the first frequency point information.

The receiving module 301 is further configured to receive a first correspondence from the network device. The first correspondence is a correspondence between the at least one first slice identification and the at least one piece of the first frequency point information.

Alternatively, the first slice information includes the at least one first slice identification, and a sequence of at least one frequency point corresponding to the at least one first slice identification is in a one-to-one correspondence with a sequence of at least one frequency point in a specific message.

Alternatively, the specific message is a first specific system information block (SIB), or the specific message is a first specific RRC message.

Alternatively, the first specific SIB is an SIB4, and/or the first specific SIB is an RRC release message.

Alternatively, the first slice information includes: the at least one first slice identification and a respective piece of first frequency point information corresponding to each of the at least one first slice identification; or the at least one piece of the first frequency point information and a respective first slice identification corresponding to each of the at least one piece of the first frequency point information.

Alternatively, the first slice information includes at least one first slice identification.

The receiving module 301 is further configured to receive at least one of at least one piece of second frequency point information or a second correspondence from the network device. The second correspondence is a correspondence between the at least one first slice identification and the at least one piece of the second frequency point information.

Alternatively, the first slice information includes the at least one piece of the first frequency point information.

The receiving module 301 is further configured to receive at least one of at least one second slice identification or a third correspondence from the network device. The third correspondence is a correspondence between the at least one first slice identification and at least one piece of second frequency point information.

Alternatively, each of the at least one second slice identification is an identification of a slice.

Alternatively, each of the at least one second slice identification is an identification of a group of slices.

Alternatively, each of the at least one second slice identification is an identification corresponding to a slice.

Alternatively, each of the at least one second slice identification is an identification corresponding to a group of slices.

Alternatively, the first slice information includes at least one piece of frequency point information.

The receiving module 301 is further configured to receive priority information of at least one frequency point indicated by the at least one piece of the first frequency point information from the network device.

Alternatively, a slice identification indicates at least one network slice.

Alternatively, a slice identification corresponds to at least one piece of frequency point information.

Alternatively, at least one piece of frequency point information is a frequency point list.

Alternatively, a slice identification is indicated by a slice index.

Alternatively, a group of slice identifications is indicated by a slice index.

Alternatively, a group of slice identifications is indicated by a slice group index.

Alternatively, the receiving module 301 is further configured to: obtain a fourth correspondence between the slice identification and the slice index.

Alternatively, the fourth correspondence is indicated by at least one of: a dedicated RRC message, system broadcasting or an NAS message, or is predefined in a protocol.

Alternatively, the first slice information is carried in at least one of: a first SIB, a dedicated RRC message or an NAS message.

Alternatively, the first SIB is of a specific type, and the specific type is one of existing SI types, and/or the first SIB is of a SI type newly added in a protocol.

Alternatively, the first SIB is a second specific SIB, and the second specific SIB is at least one SIB in existing SIBs, and/or the second specific SIB is at least one SIB newly added in a protocol.

Alternatively, a broadcast status of the first SIB is set as not broadcasting (notBroadcasting).

Alternatively, the terminal device further includes a transmission module 302.

The transmission module is configured to transmit an SIB request message to the network device. The SIB request message is configured to request the network device to transmit the first SIB or the first slice information.

Alternatively, the first slice information is complete slice information.

Alternatively, the first slice information is a segment of complete slice information, and the complete slice information includes a plurality of segments of slice information.

Alternatively, the first slice information is complete slice information, and the complete slice information includes a plurality of segments of slice information.

Alternatively, the first SIB is a complete SIB.

Alternatively, the first SIB is a complete SIB, and the first SIB includes a plurality of SIB segments.

Alternatively, the first SIB is an SIB segment of the complete SIB.

Alternatively, the receiving module 301 is further configured to receive segmentation indication information from the network device. The segmentation indication information indicates one of following situations The first slice information is complete slice information, or whether the first slice information is segmented.

The first SIB is a complete SIB, or whether the first SIB is segmented.

Whether currently received slice information is a last segment of complete slice information.

Whether currently received information is a last segment of a complete SIB.

A number of segments of the first SIB, or a number of segments of the first slice information.

Alternatively, the receiving module 301 is further configured to receive the number of segments of the complete slice information from the network device.

Alternatively, the receiving module 301 is further configured to receive the number of segments of the complete SIB from the network device.

Alternatively, the terminal device further includes a processing module 303.

The processing module is configured to perform a random access process according to the first slice information.

Alternatively, the processing module is configured to perform a cell access or a cell reselection according to the first slice information.

Alternatively, the random access process includes selecting RACH resources according to the first slice information.

Alternatively, the receiving module 301 is further configured to receive first indication information from the network device. The first indication information indicates at least one of following whether to transmit the first slice information, receiving first slice information through a first message, whether to receive the first slice information through the first message, whether to transmit the first SIB, receiving the first SIB through a second message, or whether to receive the first SIB through a second message.

Figure 4:
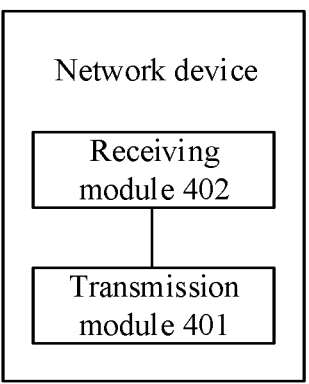
FIG. 4 is a structural schematic diagram of a network device provided in an embodiment of the present disclosure.

As illustrated in FIG. 4, an embodiment of the present disclosure provides a network device includes a transmission module 401.

The transmission module is configured to transmit first slice information to a terminal device. The first slice information includes at least one of: at least one first slice identification or at least one piece of first frequency point information.

Alternatively, each of the at least one first slice identification is an identification of a slice.

Alternatively, each of the at least one first slice identification is an identification of a group of slices.

Alternatively, each of the at least one first slice identification is an identification corresponding to a slice.

Alternatively, each of the at least one first slice identification is an identification corresponding to a group of slices.

Alternatively, the first slice information includes the at least one first slice identification and the at least one piece of the first frequency point information.

The transmission module 401 is further configured to transmit a first correspondence to the terminal device. The first correspondence is a correspondence between the at least one first slice identification and the at least one piece of the first frequency point information.

Alternatively, the first slice information includes the at least one first slice identification, and a sequence of at least one frequency point corresponding to the at least one first slice identification is in a one-to-one correspondence with a sequence of at least one frequency point in a specific message.

Alternatively, the specific message is a first specific system information block (SIB), or the specific message is a first specific RRC message.

Alternatively, the first specific SIB is an SIB4, and/or the first specific SIB is an RRC release message.

Alternatively, the first slice information includes the at least one first slice identification and a respective piece of first frequency point information corresponding to each of the at least one first slice identification.

Alternatively, the first slice information includes the at least one piece of the first frequency point information and a respective first slice identification corresponding to each of the at least one piece of the first frequency point information.

Alternatively, the first slice information includes at least one first slice identification.

The transmission module 401 is further configured to transmit at least one of at least one piece of second frequency point information or a second correspondence to the terminal device. The second correspondence is a correspondence between the at least one first slice identification and the at least one piece of the second frequency point information.

Alternatively, each of the at least one second slice identification is an identification of a slice.

Alternatively, each of the at least one second slice identification is an identification of a group of slices.

Alternatively, each of the at least one second slice identification is an identification corresponding to a slice.

Alternatively, each of the at least one second slice identification is an identification corresponding to a group of slices.

Alternatively, the first slice information includes: at least one piece of first frequency point information.

The transmission module 401 is further configured to transmit priority information of at least one frequency point indicated by the at least one piece of the first frequency point information to the terminal device.

Alternatively, a slice identification indicates at least one network slice.

Alternatively, a slice identification corresponds to at least one piece of frequency point information.

Alternatively, at least one piece of frequency point information is a frequency point list.

Alternatively, a slice identification is indicated by a slice index.

Alternatively, a group of slice identifications is indicated by a slice index

Alternatively, a group of slice identifications is indicated by a slice group index.

Alternatively, the transmission module 401 is further configured to transmit a fourth correspondence between the slice identification and the slice index to the terminal device.

Alternatively, the fourth correspondence is indicated by at least one of: a dedicated RRC message, system broadcasting or an NAS message, or is predefined in a protocol.

Alternatively, the first slice information is carried in at least one of: a first SIB, a dedicated RRC message or an NAS message.

Alternatively, the first SIB is of a specific type, and the specific type is one of existing SIB types, and/or the first SIB is of a SIB type newly added in a protocol.

Alternatively, the first SIB is a second specific SIB, and the second specific SIB is at least one SIB in existing SIBs, and/or the second specific SIB is at least one SIB newly added in a protocol.

Alternatively, a broadcast status of the first SIB is set as not broadcasting (notBroadcasting).

Alternatively, the network device further includes a receiving module 402.

The receiving module is configured to receive an SIB request message from the terminal device. The SIB request message is configured to request the network device to transmit the first SIB or the first slice information.

Alternatively, the first slice information is complete slice information.

Alternatively, the first slice information is a segment of complete slice information, and the complete slice information includes a plurality of segments of slice information.

Alternatively, the first slice information is complete slice information, and the complete slice information includes a plurality of segments of slice information.

Alternatively, the first SIB is a complete SIB.

Alternatively, the first SIB is a complete SIB, and the first SIB includes a plurality of SIB segments.

Alternatively, the first SIB is an SIB segment of the complete SIB.

Alternatively, the transmission module 401 is further configured to transmit segmentation indication information to the terminal device. The segmentation indication information indicates one of following situations.

The first slice information is complete slice information, or whether the first slice information is segmented.

The first SIB is a complete SIB, or whether the first SIB is segmented.

Whether currently received sub-slice information is a last segment of complete slice information.

Whether currently received information is a last segment of a complete SIB.

A number of segments of the first SIB, or a number of segments of the first slice information.

Alternatively, the transmission module 401 is further configured to transmit the number of segments of the complete slice information to the terminal device.

Alternatively, the transmission module 401 is further configured to transmit the number of segments of the complete SIB segment to the terminal device.

Alternatively, the transmission module 401 is further configured to transmit first indication information to the terminal device. The first indication information indicates at least one of: whether to transmit the first slice information, receiving first slice information through a first message, whether to receive the first slice information through the first message, whether to transmit the first SIB, receiving the first SIB through a second message, or whether to receive the first SIB through a second message.

An embodiment of the present disclosure further provides a terminal device, which includes a memory having stored thereon executable program codes and a processor coupled to the memory.

The processor invokes the executable program codes stored in the memory to perform the method for indicating slice information performed by the terminal device in the embodiment of the present disclosure.

An embodiment of the present disclosure further provides a network device, which includes a memory having stored thereon executable program codes and a processor coupled to the memory.

The processor invokes the executable program codes stored in the memory to perform the instruction method for indicating slice information performed by the network device in the embodiment of the present disclosure.

Figure 5:
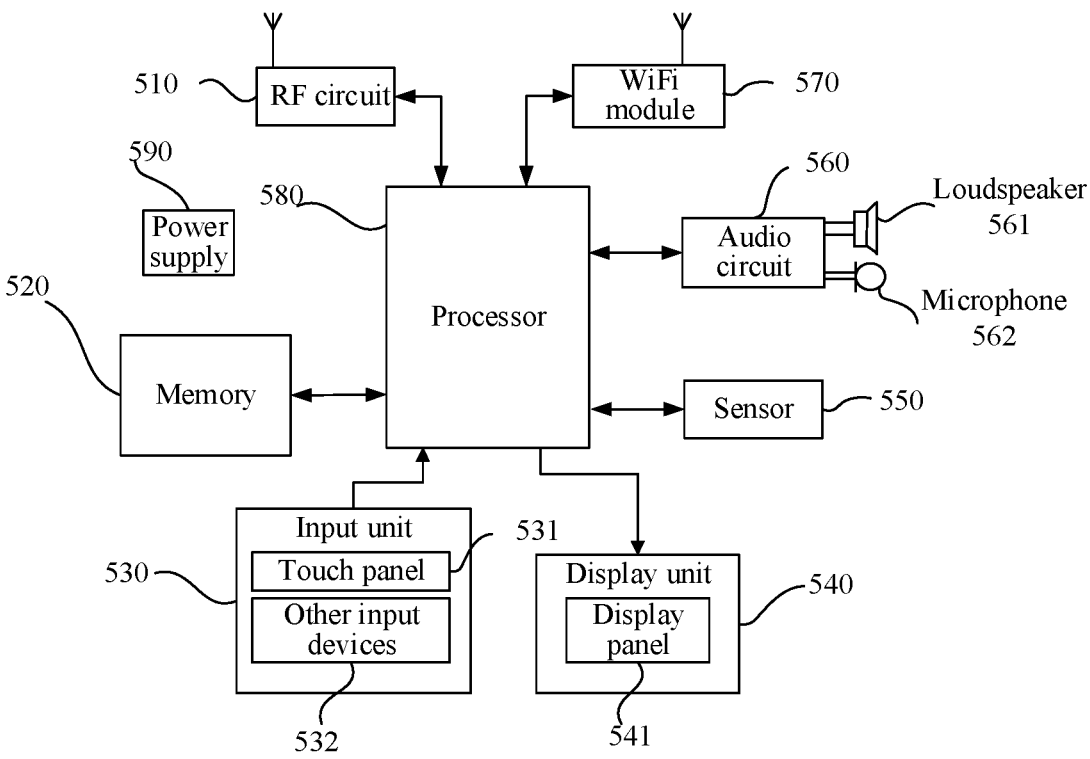
FIG. 5 is a structural schematic diagram of a mobile phone provided in an embodiment of the present disclosure.

Exemplarily, the terminal device in embodiments of the present disclosure may be a mobile phone, as illustrated in FIG. 5, the mobile phone may include components such as a radio frequency (RF) circuit 510, a memory 520, an input unit 530, a display unit 540, a sensor 550, an audio circuit 560, a wireless fidelity (WiFi) module 570, a processor 580, and a power supply 590. The RF circuit 510 includes a receiver 511 and a transmitter 512. Those skilled in the art will appreciate that the mobile phone configuration illustrated in FIG. 5 does not the mobile phone, and the mobile phone may include more or fewer components than that of the illustrated mobile phone, or the mobile phone may include a combination of certain components, or different component arrangements.

The RF circuit 510 may be configured to receive and transmit signals during transmitting and receiving information or during conversation. In particular, downlink information received from the base station is then processed by the processor 580. In addition, the uplink data is transmitted to the base station. Generally, the RF circuit 510 includes but is not limited to antennas, at least one amplifier, a transceiver, a coupler, a low noise amplifier (LNA), a diplexer and the like. In addition, the RF circuit 510 may also communicate with networks and other devices through wireless communication. The wireless communication may use a communication standard or a protocol, including but not limited to GSM, GPRS, CDMA, WCDMA, LTE, E-mail, short messaging service (SMS), etc.

The memory 520 may be used for storing software programs and modules, and the processor 580 performs various functional applications and data processing of the mobile phone by running software programs and modules stored in the memory 520. The memory 520 may mainly include a program storage area and a data storage area. The program storage area may store operating systems, application programs required by at least one function (such as, a sound playback function, an image playback function, etc.), and the like. The data storage area may store data (such as, audio data, phone book, etc.) created according to the use of the mobile phone. Additionally, the memory 520 may include high-speed random access memory and may further include non-volatile memory, such as at least one disk memory device, a flash memory device or other volatile solid-state memory device.

The input unit 530 may be configured to receive input numeric or character information and to generate key signal input related to user settings and function control of the mobile phone. Specifically, the input unit 530 may include a touch panel 531 and other input devices 532. The touch panel 531, also referred to as a touch screen, may collect user touch operations on or near the touch panel 531 (such as user operations on or near the touch panel 531 by using any suitable object or accessory like a finger, a stylus, etc.) and drive corresponding apparatuses connected thereto according to a preset program. Alternatively, the touch panel 531 may include two parts, i.e., a touch detection apparatus and a touch controller. The touch detection apparatus detects touch orientations of the user and signals brought by the touch operations, and transmits the signals to the touch controller. The touch controller receives touch information from the touch detection apparatus, converts the touch information into contact coordinates and transmits the contact coordinates to the processor 580, and the touch controller may receive and execute commands from the processor 580. In addition, the touch panel 531 may be implemented in various types, such as resistance, capacitance, infrared and surface acoustic waves. The input unit 530 may include other input devices 532 in addition to the touch panel 531. Specifically, other input devices 532 may include but are not limited to one or more of a physical keyboard, function keys (such as volume control keys, switch keys etc.), trackball, mouse and joystick, etc.

The display unit 540 may be configured to display information input by the user or provided to the user and various menus of the mobile phone. The display unit 540 may include a display panel 541. Alternatively, the display panel 541 may be configured in the form of a liquid crystal display (LCD), an organic light-Emitting diode (OLED) or the like. Further, the touch panel 531 may overlay the display panel 541, and when the touch panel 531 detects a touch operation on or near the touch panel, the touch panel transmits the touch operation to the processor 580, to determine a type of the touch event, and then the processor 580 provides a corresponding visual output on the display panel 541 according to the type of the touch event. Although in FIG. 5, the touch panel 531 and the display panel 541 are two independent components to implement the input and input functions of the mobile phone, in some embodiments, the touch panel 531 and the display panel 541 may be integrated to implement the input and output functions of the mobile phone.

The mobile phone may further include at least one sensor 550, such as an optical sensor, a motion sensor and other sensors. Specifically, the optical sensor may include an ambient optical sensor and a proximity sensor. The ambient optical sensor may adjust the brightness of the display panel 541 according to the brightness of the ambient light, and the proximity sensor may turn off the display panel 541 and/or backlight when the mobile phone moves nearby the car. As a kind of motion sensor, an accelerometer sensor may detect the acceleration in various directions (usually three axes), and may detect magnitude and direction of the gravity when the accelerometer sensor is static. The accelerometer sensor may be used in the application for identifying an attitude of the a mobile phone (such as switching, between horizontal and vertical screen, associated games, magnetometer attitude calibration), vibration recognition related functions (such as pedometer, knocking), etc. Other sensors such as gyroscopes, barometers, hygrometers, thermometers, infrared sensors may also be configured in mobile phones, which will not be elaborated herein again.

A audio circuit 560, a loudspeaker 561 and a microphone 562 may provide an audio interface between the user and the mobile phone. The audio circuit 560 may transmit the electrical signal converted from the received audio data to the loudspeaker 561, and the loudspeaker 561 converts the received audio data into an audio signal for output. On the other hand, the microphone 562 converts the collected sound signal into an electrical signal, the electrical signal is received and converted into audio data by the audio circuit 560, then the audio data is output to the processor 580 for processing, and then the audio data is transmitted to, for example, another mobile phone via the RF circuit 510, or to the memory 520 for further processing.

WiFi is a short-distance wireless transmission technology. The mobile phone may help the user transmit and receive e-mails, browse web pages and access streaming media through WiFi module 570, which provides the user with wireless broadband Internet access. Although the WiFi module 570 is illustrated in FIG. 5, it is understood that it is not an essential component of the mobile phone and may be omitted according to the requirement without altering the essence of the present disclosure.

The processor 580 is a control center of the mobile phone. The processor connects various parts of the whole mobile phone with various interfaces and lines, performs various functions of the mobile phone and processes data by running or executing software programs and/or modules stored in the memory 520 and invoking data stored in the memory 520, thereby monitoring the whole mobile phone. Alternatively, the processor 580 may include one or more processing units. Preferably, the processor 580 may integrate an application processor and a modem processor. The application processor primarily handles operating systems, user interfaces, applications, and the like, and the modem processor primarily handles wireless communications. It will be appreciated that the modem processor described above may also not be integrated into the processor 580.

The mobile phone further includes a power supply 590 (such as a battery) for supplying power to the various components, and preferably, the power supply may be logically connected to the processor 580 through a power management system, thereby achieving functions such as managing charging, discharging, and power consumption management through the power management system. Although not illustrated, the mobile phone may further include a camera, a Bluetooth module, etc., which will not be elaborated herein again.

In the embodiment of the present disclosure, the RF circuit 510 is configured to receive first slice information from a network device. The first slice information includes at least one of: at least one first slice identification or at least one piece of first frequency point information.

Alternatively, each of the at least one first slice identification is an identification of a slice.

Alternatively, each of the at least one first slice identification is an identification of a group of slices.

Alternatively, each of the at least one first slice identification is an identification corresponding to a slice.

Alternatively, each of the at least one first slice identification is an identification corresponding to a group of slices.

Alternatively, the first slice information includes the at least one first slice identification and the at least one piece of the first frequency point information.

The RF circuit 510 is further configured to receive a first correspondence from the network device. The first correspondence is a correspondence between the at least one first slice identification and the at least one piece of the first frequency point information.

Alternatively, the first slice information includes the at least one first slice identification. A sequence of at least one frequency point corresponding to the at least one first slice identification is in a one-to-one correspondence with a sequence of at least one frequency point in a specific message.

Alternatively, the specific message is a first specific SIB, or the specific message is a first specific RRC message.

Alternatively, the first specific SIB is an SIB4, and/or the first specific SIB is an RRC release message.

Alternatively, the first slice information includes the at least one first slice identification and a respective piece of first frequency point information corresponding to each of the at least one first slice identification.

Alternatively, the first slice information includes the at least one piece of the first frequency point information and a respective first slice identification corresponding to each of the at least one piece of the first frequency point information.

Alternatively, the first slice information includes at least one first slice identification.

The RF circuit 510 is further configured to receive at least one of at least one piece of second frequency point information or a second correspondence from the network device. The second correspondence is a correspondence between the at least one first slice identification and the at least one piece of the second frequency point information.

Alternatively, the first slice information includes the at least one piece of the first frequency point information.

The RF circuit 510 is further configured to receive at least one of at least one second slice identification or a third correspondence from the network device. The third correspondence is a correspondence between the at least one second slice identification and at least one piece of first frequency point information.

Alternatively, each of the at least one second slice identification is an identification of a slice.

Alternatively, each of the at least one second slice identification is an identification of a group of slices.

Alternatively, each of the at least one second slice identification is an identification corresponding to a slice.

Alternatively, each of the at least one second slice identification is an identification corresponding to a group of slices.

Alternatively, the first slice information includes at least one piece of first frequency point information.

The RF circuit 510 is further configured to receive priority information of at least one frequency point indicated by the at least one piece of the first frequency point information from the network device.

Alternatively, a slice identification indicates at least one network slice.

Alternatively, a slice identification corresponds to at least one piece of frequency point information.

Alternatively, at least one piece of frequency point information is a frequency point list.

Alternatively, a slice identification is indicated by a slice index.

Alternatively, a group of slice identifications is indicated by a slice index.

Alternatively, a group of slice identifications is indicated by a slice group index.

Alternatively, the RF circuit 510 is further configured to: obtain a fourth correspondence between the slice identification and the slice index.

Alternatively, the fourth correspondence is indicated by at least one of: a dedicated RRC message, system broadcasting or an NAS message, or is predefined in a protocol.

Alternatively, the first slice information is carried in at least one of: a first SIB, a dedicated RRC message or an NAS message.

Alternatively, the first SIB is of a specific type, and the specific type is one of existing SI types, and/or the first SIB is of a SI type newly added in a protocol.

Alternatively, the first SIB is a second specific SIB, and the second specific SIB is at least one SIB in existing SIBs, and/or the second specific SIB is at least one SIB newly added in a protocol.

Alternatively, a broadcast status of the first SIB is set as not broadcasting (notBroadcasting).

Alternatively, the terminal device further includes the RF circuit 510

The RF circuit is configured to transmit an SIB request message to the network device. The SIB request message is configured to request the network device to transmit the first SIB or the first slice information.

Alternatively, the first slice information is complete slice information.

Alternatively, the first slice information is a segment of complete slice information, and the complete slice information includes a plurality of segments of slice information.

Alternatively, the first slice information is complete slice information, and the complete slice information includes a plurality of segments of slice information.

Alternatively, the first SIB is a complete SIB.

Alternatively, the first SIB is a complete SIB, and the first SIB includes a plurality of SIB segments.

Alternatively, the first SIB is an SIB segment of the complete SIB.

Alternatively, the RF circuit 510 is further configured to receive segmentation indication information from the network device. The segmentation indication information indicates one of following situations.

The first slice information is complete slice information, or whether the first slice information is segmented.

The first SIB is a complete SIB, or whether the first SIB is segmented.

Whether currently received slice information is a last segment of complete slice information.

Whether currently received information is a last segment of a complete SIB.

A number of segments of the first SIB, or a number of segments of the first slice information.

Alternatively, the RF circuit 510 is further configured to receive the number of segments of the complete slice information from the network device.

Alternatively, the RF circuit 510 is further configured to receive the number of segments of the complete SIB from the network device.

Alternatively, the terminal device further includes a processor 580.

The processor is configured to perform a random access process according to the first slice information.

Alternatively, the processor is configured to perform a cell access or a cell reselection according to the first slice information.

Alternatively, the random access process includes selecting RACH resources according to the first slice information.

Figure 6:
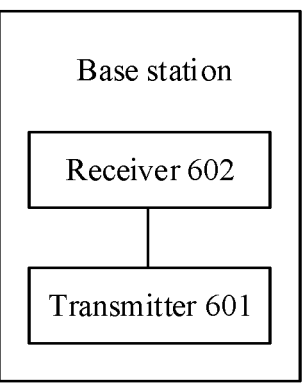
FIG. 6 is a structural schematic diagram of a base station provided in an embodiment of the present disclosure.

Exemplarily, as illustrated in FIG. 6, the network device in an embodiment of the present disclosure may be a base station which includes a transmitter 601.

The transmitter 601 is configured to transmit first slice information to a terminal device. The first slice information includes at least one of: at least one first slice identification or at least one piece of first frequency point information.

Alternatively, each of the at least one first slice identification is an identification of a slice.

Alternatively, each of the at least one first slice identification is an identification of a group of slices.

Alternatively, each of the at least one first slice identification is an identification corresponding to a slice.

Alternatively, each of the at least one first slice identification is an identification corresponding to a group of slices.

Alternatively, the first slice information includes the at least one first slice identification and the at least one piece of the first frequency point information.

The transmitter 601 is further configured to transmit a first correspondence to the terminal device. The first correspondence is a correspondence between the at least one first slice identification and the at least one piece of the first frequency point information.

Alternatively, the first slice information includes the at least one first slice identification, and a sequence of at least one frequency point corresponding to the at least one first slice identification is in a one-to-one correspondence with a sequence of at least one frequency point in a specific message.

Alternatively, the specific message is a first specific SIB, or the specific message is a first specific RRC message.

Alternatively, the first specific SIB is an SIB4, and/or the first specific SIB is an RRC release message.

Alternatively, the first slice information includes the at least one first slice identification and a respective piece of first frequency point information corresponding to each of the at least one first slice identification.

Alternatively, the first slice information includes the at least one piece of the first frequency point information and a respective first slice identification corresponding to each of the at least one piece of the first frequency point information.

Alternatively, the first slice information includes at least one first slice identification.

The transmitter 601 is further configured to transmit at least one of at least one piece of second frequency point information or a second correspondence to the terminal device. The second correspondence is a correspondence between the at least one first slice identification and the at least one piece of the second frequency point information.

Alternatively, each of the at least one second slice identification is an identification of a slice.

Alternatively, each of the at least one second slice identification is an identification of a group of slices.

Alternatively, each of the at least one second slice identification is an identification corresponding to a slice.

Alternatively, each of the at least one second slice identification is an identification corresponding to a group of slices.

Alternatively, the first slice information includes: at least one piece of first frequency point information.

The transmitter 601 is further configured to transmit priority information of at least one frequency point indicated by the at least one piece of the first frequency point information to the terminal device.

Alternatively, a slice identification indicates at least one network slice.

Alternatively, a slice identification corresponds to at least one piece of frequency point information.

Alternatively, at least one piece of frequency point information is a frequency point list.

Alternatively, a slice identification is indicated by a slice index.

Alternatively, a group of slice identifications is indicated by a slice index.

Alternatively, a group of slice identifications is indicated by a slice group index.

Alternatively, the transmitter 601 is further configured to transmit a fourth correspondence between the slice identification and the slice index to the terminal device.

Alternatively, the fourth correspondence is indicated by at least one of: a dedicated RRC message, system broadcasting or an NAS message, or is predefined in a protocol.

Alternatively, the first slice information is carried in at least one of: a first SIB, a dedicated RRC message or an NAS message.

Alternatively, the first SIB is of a specific type, and the specific type is one of existing SI types, and/or the first SIB is of a SI type newly added in a protocol.

Alternatively, the first SIB is a second specific SIB, and the second specific SIB is at least one SIB in existing SIBs, and/or the second specific SIB is at least one SIB newly added in a protocol.

Alternatively, a broadcast status of the first SIB is set as not broadcasting (notBroadcasting).

Alternatively, the network device further includes a receiver 602.

The receiver is configured to receive an SIB request message from the terminal device. The SIB request message is configured to request the network device to transmit the first SIB or the first slice information.

Alternatively, the first slice information is complete slice information.

Alternatively, the first slice information is a segment of complete slice information, and the complete slice information includes a plurality of segments of slice information.

Alternatively, the first slice information is complete slice information, and the complete slice information includes a plurality of segments of slice information.

Alternatively, the first SIB is a complete SIB.

Alternatively, the first SIB is a complete SIB, and the first SIB includes a plurality of SIB segments.

Alternatively, the first SIB is an SIB segment of the complete SIB.

Alternatively, the transmitter 601 is further configured to transmit segmentation indication information to the terminal device. The segmentation indication information indicates one of following situations.

The first slice information is complete slice information, or whether the first slice information is segmented.

The first SIB is a complete SIB, or whether the first SIB is segmented.

Whether currently received sub-slice information is a last segment of complete slice information.

Whether currently received information is a last segment of a complete SIB.

A number of segments of the first SIB, or a number of segments of the first slice information.

Alternatively, the transmitter 601 is further configured to transmit the number of segments of the complete slice information to the terminal device.

Alternatively, the transmitter 601 is further configured to transmit the number of segments of the complete SIB segment to the terminal device.

An embodiment of the present disclosure further provides a computer-readable storage medium, which includes computer instructions that, when run on a computer, cause the computer to perform various processes performed by the terminal device as in the method embodiments described above.

An embodiment of the present disclosure further provides a computer-readable storage medium, which includes computer instructions that, when run on a computer, cause the computer to perform various processes performed by the network device as in the method embodiments described above.

An embodiment of the present disclosure further provides a computer program product having stored thereon computer instructions, when the computer program product is run on a computer, the computer executes the computer instructions to cause the computer to perform various processes performed by the terminal device as in the method embodiments described above.

An embodiment of the present disclosure further provides a computer program product having stored thereon computer instructions, when the computer program product is run on a computer, the computer executes the computer instructions to cause the computer to perform various processes performed by the network device as in the method embodiments described above.

An embodiment of the present disclosure further provides a chip coupled with a memory in a terminal device, when running, the chip calls program instructions stored in the memory to cause the terminal device to perform various processes performed by the terminal device as in the method embodiment.

An embodiment of the present disclosure further provides a chip coupled with a memory in a network device, when running, the chip calls program instructions stored in the memory, to cause the network device to perform various processes performed by the network device as in the above method embodiment.

The above embodiments may be implemented in whole or in part by software, hardware, firmware or any combination thereof. In the case of being implemented by software, it may be implemented in whole or in part in the form of a computer program product. The computer program product includes one or more computer instructions. When the computer program instructions are loaded and executed on a computer, all or part of the processes or functions described in the embodiments of the present application are generated. The computer may be a general-purpose computer, a special-purpose computer, a computer network, or other programmable apparatuses. The computer instructions may be stored in a computer-readable storage medium or transmitted from a computer-readable storage medium to another computer-readable storage medium, for example, the computer instructions may be transmitted from a website site, a computer, a server or a data center to another website site, computer, server or data center through a wired way (for example, a coaxial cable, a optical fiber, a digital subscriber line (DSL), etc.) or a wireless way (for example, infrared, wireless, microwave, etc.). The computer-readable storage medium may be any available medium that can be accessed by a computer, or may be a data storage device containing an integrated server, data center, etc., integrated by one or more available media. The available medium may be a magnetic medium (for example, a floppy disk, a hard disk, a magnetic tape, etc.), an optical medium (for example, a digital videodisk (DVD)), or a semiconductor medium (for example, a solid state disk (SSD)), etc.

The terms "first", "second", "third", "fourth" and the like (if present) in the specification and claims of the present disclosure and the above drawings are for distinguishing similar objects and not necessary to describe a particular order or priority. It should be understood that the data used in this way may be interchanged where appropriate, so that the embodiments described herein may be implemented in an order other than that illustrated or described herein. In addition, the terms "including" and "having" and any variations of them intend to cover non-exclusive inclusion. For example, a process, a method, a system, a product, or a device that includes a series of operations or units is not limited to those specifically listed, but may include other operations or units that are not specifically listed or inherent to such the process, the method, the product, or the device.

The invention claimed is:

1. A method for indicating slice information, comprising:
receiving first slice information from a network device, wherein the first slice information comprises a plurality of first slice identifications, wherein a sequence of a plurality of frequency points corresponding to the plurality of first slice identifications is in a one-to-one correspondence with a sequence of a plurality of frequency points in a first specific system information block (SIB), and the first specific SIB is an SIB4.

2. The method of claim 1, wherein
each of the plurality of first slice identifications is an identification of a slice; or
each of the plurality of first slice identifications is an identification of a group of slices.

3. The method of claim 1, wherein
a slice identification is indicated by a slice index; or
a group of slice identifications is indicated by a slice index; or
a group of slice identifications is indicated by a slice group index.

4. The method of claim 3, further comprising:
obtaining a correspondence between the slice identification and the slice index.

5. The method of claim 4, wherein the correspondence is indicated by a non-access stratum (NAS) message.

6. The method of claim 1, wherein
the first slice information is carried in at least one of: a first SIB, a dedicated radio resource control (RRC) message or an NAS message, and
the first SIB is a second specific SIB, and the second specific SIB is at least one SIB newly added in a protocol.

7. The method of claim 1, further comprising:
performing a random access process according to the first slice information; or
performing a cell access or a cell reselection according to the first slice information.

8. A terminal device, comprising:
a processor; and
a memory for storing a computer program executable by the processor,
wherein the processor is configured to execute the computer program to:
receive first slice information from a network device, wherein the first slice information comprises a plurality of first slice identifications, wherein a sequence of a plurality of frequency points corresponding to the plurality of first slice identifications is in a one-to-one correspondence with a sequence of a plurality of frequency points in a first specific system information block (SIB), and the first specific SIB is an SIB4.

9. A network device comprising:
a processor; and
a memory for storing a computer program executable by the processor,
wherein the processor is configured to execute the computer program to:
transmit first slice information to a terminal device, wherein the first slice information comprises a plurality of first slice identifications, wherein a sequence of a plurality of frequency points corresponding to the plurality of first slice identifications is in a one-to-one correspondence with a sequence of a plurality of frequency points in a first specific system information block (SIB), and the first specific SIB is an SIB4.

10. The network device of claim 9, wherein
each of the plurality of first slice identifications is an identification of a slice; or
each of the plurality of first slice identifications is an identification of a group of slices.

11. The method of claim 1, wherein
frequency point information of the plurality of frequency points corresponding to the plurality of first slice identifications comprises a frequency point priority.

12. The method of claim 1, wherein the plurality of frequency points in the SIB4 are indicated before the plurality of first slice identifications are indicated in the first slice information.

13. The terminal device of claim 8, wherein
each of the plurality of first slice identifications is an identification of a slice; or
each of the plurality of first slice identifications is an identification of a group of slices.

14. The terminal device of claim 8, wherein
a slice identification is indicated by a slice index; or
a group of slice identifications is indicated by a slice index; or
a group of slice identifications is indicated by a slice group index.

15. The terminal device of claim 8, wherein frequency point information of the plurality of frequency points corresponding to the plurality of first slice identifications comprises a frequency point priority.

16. The terminal device of claim 8, wherein the plurality of frequency points in the SIB4 are indicated before the plurality of first slice identifications are indicated in the first slice information.

17. The terminal device of claim 8, wherein
the first slice information is carried in at least one of: a first SIB, a dedicated radio resource control (RRC) message or an NAS message, and
the first SIB is a second specific SIB, and the second specific SIB is at least one SIB newly added in a protocol.

18. The terminal device of claim 8, wherein the processor is further configured to execute the computer program to:

perform a random access process according to the first slice information; or perform a cell access or a cell reselection according to the first slice information.

19. The network device of claim 9, wherein frequency point information of the plurality of frequency points corresponding to the plurality of first slice identifications comprises a frequency point priority.

20. The network device of claim 9, wherein the plurality of frequency points in the SIB4 are indicated before the plurality of first slice identifications are indicated in the first slice information.

* * * * *